United States Patent
Robertson et al.

(10) Patent No.: US 12,392,888 B2
(45) Date of Patent: Aug. 19, 2025

(54) COMPACT RADAR SYSTEM

(71) Applicant: Fortem Technologies, Inc., Pleasant Grove, UT (US)

(72) Inventors: Adam Eugene Robertson, Provo, UT (US); Jon Erik Knabenschuh, Orem, UT (US); Lyman Davies Horne, South Jordan, UT (US); Tyler Drue Park, Springville, UT (US); Matthew Robertson Morin, Orem, UT (US); James David Mackie, Provo, UT (US); Matthew Elliott Argyle, Lindon, UT (US); Bryan Alan Davis, Salt Lake City, UT (US); Chester Parker Ferry, Pleasant Grove, UT (US); Daniel Glen Bezzant, Alpine, UT (US); Justin Craig Huntington, Provo, UT (US); Nathan James Packard, Provo, UT (US)

(73) Assignee: Fortem Technologies, Inc., Pleasant Grove, UT (US)

(*) Notice: Subject to any disclaimer, the term of this patent is extended or adjusted under 35 U.S.C. 154(b) by 0 days.

(21) Appl. No.: 18/623,473

(22) Filed: Apr. 1, 2024

(65) Prior Publication Data
US 2024/0264301 A1    Aug. 8, 2024

Related U.S. Application Data

(63) Continuation of application No. 17/833,081, filed on Jun. 6, 2022, now Pat. No. 11,947,000, which is a continuation of application No. 16/129,136, filed on Sep. 12, 2018, now Pat. No. 11,353,575.

(60) Provisional application No. 62/557,726, filed on Sep. 12, 2017.

(51) Int. Cl.
G01S 13/87    (2006.01)
G01S 7/28     (2006.01)
G01S 13/00    (2006.01)
G01S 13/04    (2006.01)

(52) U.S. Cl.
CPC .......... *G01S 13/872* (2013.01); *G01S 7/2813* (2013.01); *G01S 13/003* (2013.01); *G01S 13/04* (2013.01)

(58) Field of Classification Search
CPC .... G01S 13/872; G01S 7/2813; G01S 13/003; G01S 13/04
USPC ................... 342/43, 81, 159, 162, 192, 372
See application file for complete search history.

(56) References Cited

U.S. PATENT DOCUMENTS 8,947,294 B1 * 2/2015 Wasiewicz ............ G01S 7/2813
                                                      342/162

* cited by examiner

*Primary Examiner* — Bo Fan

(57) ABSTRACT

Systems, methods, and computer-readable media are described for compact radar systems. In some examples, a compact radar system can include a first set of transmit antennas, a second set of receive antennas, one or more processors, and at least one computer-readable storage medium storing computer-executable instructions which, when executed by the one or more processors, cause the radar system to coordinate digital beam steering of the first set of transmit antennas and the second set of receive antennas, and coordinate digital beam forming with one or more of the second set of receive antennas to detect one or more objects within a distance of the radar system.

20 Claims, 24 Drawing Sheets

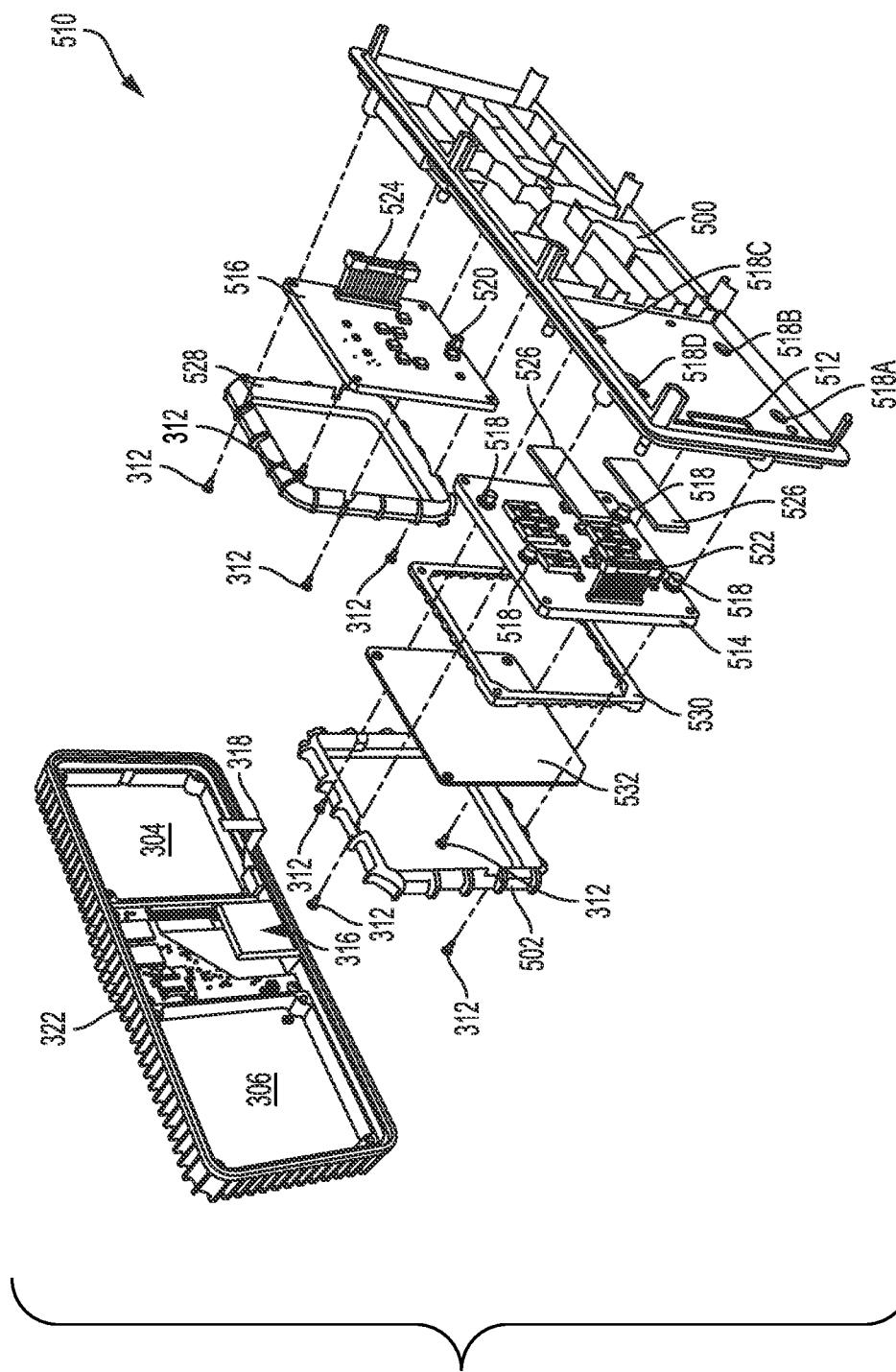

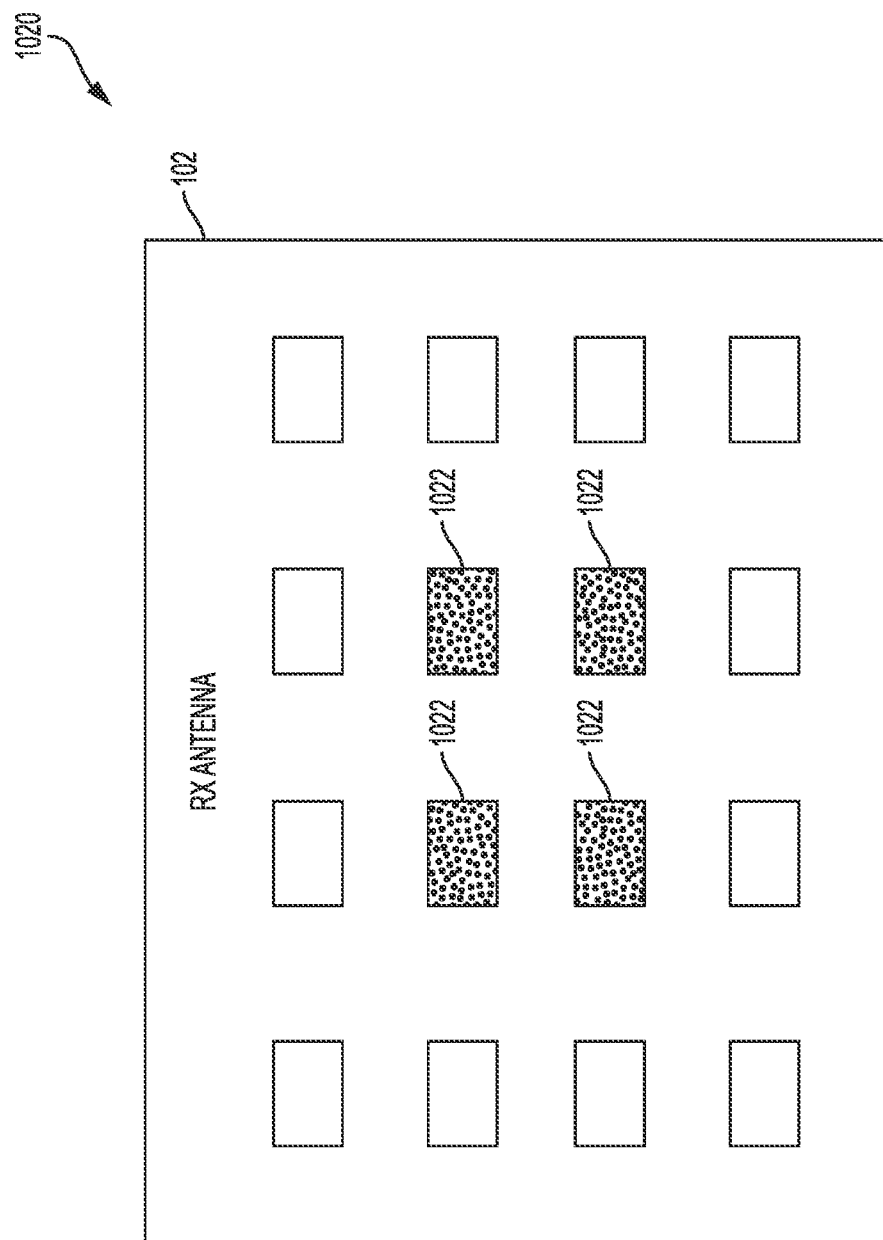

COMPACT RADAR SYSTEM

CROSS-REFERENCE TO RELATED APPLICATIONS

The present application is a continuation of U.S. patent application Ser. No. 17/833,081, filed Jun. 6, 2022, which is a continuation of U.S. patent application Ser. No. 16/129,136, filed Sep. 12, 2019, now U.S. Pat. No. 11,353,575, issued Jun. 7, 2022, which claims the benefit of, and priority to, U.S. Provisional Patent Application No. 62/557,726 filed on Sep. 12, 2017, entitled "COMPACT RADAR SYSTEM", the contents of which are hereby expressly incorporated by reference in their entirety.

TECHNICAL FIELD

The present technology pertains to radar technologies, and more specifically to a compact radar system.

BACKGROUND

The widespread use of air and ground vehicles, such as cars, aircraft, and drones has created congested spaces for traveling, increasing the risks of collisions and the difficulty of managing traffic. Various technologies have been used to help monitor, manage, and alleviate traffic in a particular space. For example, camera systems and other sensors can be mounted on vehicles or other objects to monitor the trajectory and relative distance of objects and manage traffic patterns. In some cases, radar systems can be mounted on air or ground vehicles to detect and monitor nearby objects, and help guide or manage the movement of such vehicles.

Unfortunately, current radar system solutions often have limited detection accuracy and coverage. For example, the radio signals produced by radar technology can vary in terms of clarity and completeness, which can affect the performance quality and accuracy of the radar system. Moreover, the sent and received signals in a radar system can create signal noise, clutter, jamming, etc., further degrading the performance of the radar system. The detection range and field of view (FOV) of radar systems are often limited, resulting in reduced awareness of the environment and surrounding objects. In addition, current radar solutions are generally large and heavy, thus limiting where and how such radar systems may be mounted or implemented.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only example implementations of the disclosure and are not therefore to be considered to be limiting of its scope, the principles herein will be described and explained with additional specificity and detail through the use of the accompanying drawings in which:

FIG. 5B illustrates an arrangement for connecting or attaching various components of a compact radar system, including a radio frequency modulator, a printed circuit board, a receive outer parasitic board, and a transmit parasitic board, in accordance with some embodiments;

FIG. 10B illustrates an example receive antenna design for a compact radar system, in accordance with some embodiments;

DETAILED DESCRIPTION

Figure 1A:
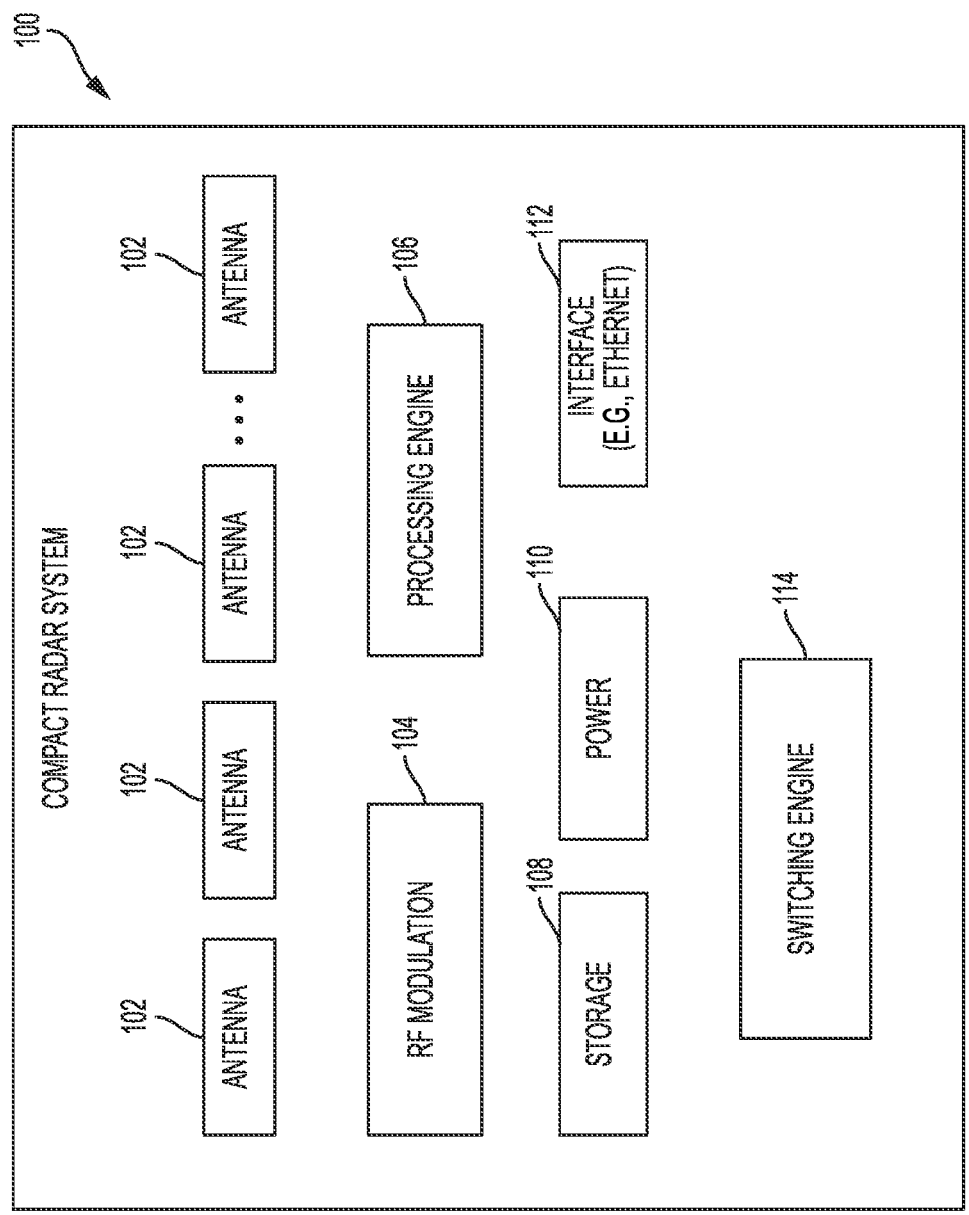
FIG. 1A illustrates an example configuration of a compact radar system, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can refer to the same embodiment or any disclosed embodiment. For example, reference to "one embodiment", "an embodiment" or "some embodiments" means that any features, concepts, structures, and/or characteristics described in connection with such embodiment(s) are included in at least such embodiment(s) of the disclosure, but are not limited to such embodiment(s) and can indeed be included in any other embodiment(s) of the disclosure. The appearances of the phrases "in one embodiment", "in an embodiment" or "in some embodiments" in various places in the disclosure are not necessarily all referring to the same embodiment(s), nor are separate or alternative embodiments mutually exclusive of other embodiments.

The terms used in this specification generally have their ordinary meanings in the art, within the context of the disclosure, and in the specific context where each term is used. Unless otherwise defined, technical and scientific terms used herein have the meaning as commonly understood by one of ordinary skill in the art to which this disclosure pertains. In the case of conflict, the present document, including definitions and description will control.

Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Note that titles or subtitles may be used in the examples for convenience of a reader, which in no way should limit the scope of the disclosure.

Without intent to limit the scope of the disclosure, examples of instruments, apparatus, methods and their related results according to embodiments of the present disclosure are given below. However, the disclosure is not limited to the examples or embodiments described in this specification. Additional features and advantages of the disclosure will be set forth in the description which follows, and in part will be obvious from the description, or can be learned by practice of the principles disclosed herein. The features and advantages of the disclosure can be realized and obtained by means of the instruments, elements and techniques particularly pointed out in the appended claims. These and other features of the disclosure will become more fully apparent from the following description and appended claims, and/or can be learned by the practice of the principles set forth herein.

OVERVIEW

Disclosed herein are systems, methods, and computer-readable media for a compact radar system. The compact radar systems described herein can have a low size, weight, power and cost (SWaP-C), increased spherical coverage, high update rates, and better radar cross-section (RCS) performance. The compact radar systems can include multiple antennas for radar-based detection, which can be configured to increase the signaling bandwidth, as described herein. The compact radar systems can perform digital beam steering and forming to increase efficiency and accuracy and suppress noise, clutter, jamming, etc. The compact radar systems can isolate radar transmissions from signal reflections to avoid noise, error, interference, etc. The compact radar systems can also perform RF channeling and modulation to obtain RF channel isolation, mechanical vibration reductions, wave propagation, etc.

In some implementations, a compact radar system is provided which can include a first set of transmit antennas; a second set of receive antennas; one or more processors; and at least one computer-readable storage medium storing computer-executable instructions which, when executed by the one or more processors, cause the radar system to coordinate digital beam steering of the first set of transmit antennas and the second set of receive antennas, and coordinate digital beam forming with one or more of the second set of receive antennas to detect one or more objects within a distance of the radar system.

The compact radar system can determine the angle (i.e. elevation and azimuth), range, radar cross section, and/or velocity of objects relative to the compact radar system. In some cases, the compact radar system can suppress noise, clutter, and/or jamming at the compact radar system. In some cases, the compact radar system can also perform space time adaptive processing from among the second set of receive antennas.

The compact radar system can include fins between the first set of transmit antennas and the second set of receive antennas to isolate radar transmissions from signal reflections received at the compact radar system. The compact radar system can also include an RF (Radio Frequency) channeling which the compact radar system can use for heat dissipation, RF channel isolation, mechanical vibration reduction, wave propagation, RF modulation, etc.

In some implementations, a method is provided for implementing a compact radar system. In an example method, a compact radar system can be deployed for radar detection. The compact radar system can be configured to detect one or more objects within a distance of the compact radar system. The compact radar system can include one or more processors, a first set of receive antennas and a second set of transmit antennas. The one or more processors can be configured to coordinate (a) digital beam steering of the first set of receive antennas and the second set of transmit antennas and (b) digital beam forming at the first set of receive antennas and the second set of transmit antennas to detect the one or more objects.

The example method can further involve sending, using at least one of the first set of receive antennas, one or more electromagnetic signals; receiving, using at least one of the second set of transmit antennas, one or more returned electromagnetic signals; and based on the one or more returned electromagnetic signals, detecting an object within the distance of the radar system. In some cases, detecting the object can include determining an angle, a range, a radar cross section, and/or a velocity of the object relative to the compact radar system. Moreover, in some cases, coordinating digital beam steering and digital beam forming can include suppressing signal noise, clutter, and/or jamming at the compact radar system.

In some examples, the method can involve performing, by the compact radar system, space time adaptive processing from among the first set of receive antennas. Moreover, in some examples, the method can include isolating radar transmissions from received signal reflections using an RF channeling element and/or one or more fins between the first set of receive antennas and the second set of transmit antennas. The fins can also be used to assist in heat dissipation at the compact radar system.

In some cases, the method can implement an RF channeling element in the compact radar system. The method can use the RF channeling element to perform heat dissipation, RF channel isolation, mechanical vibration reduction, wave propagation, RF modulation, etc.

DESCRIPTION OF EXAMPLE EMBODIMENTS

Figure 12:
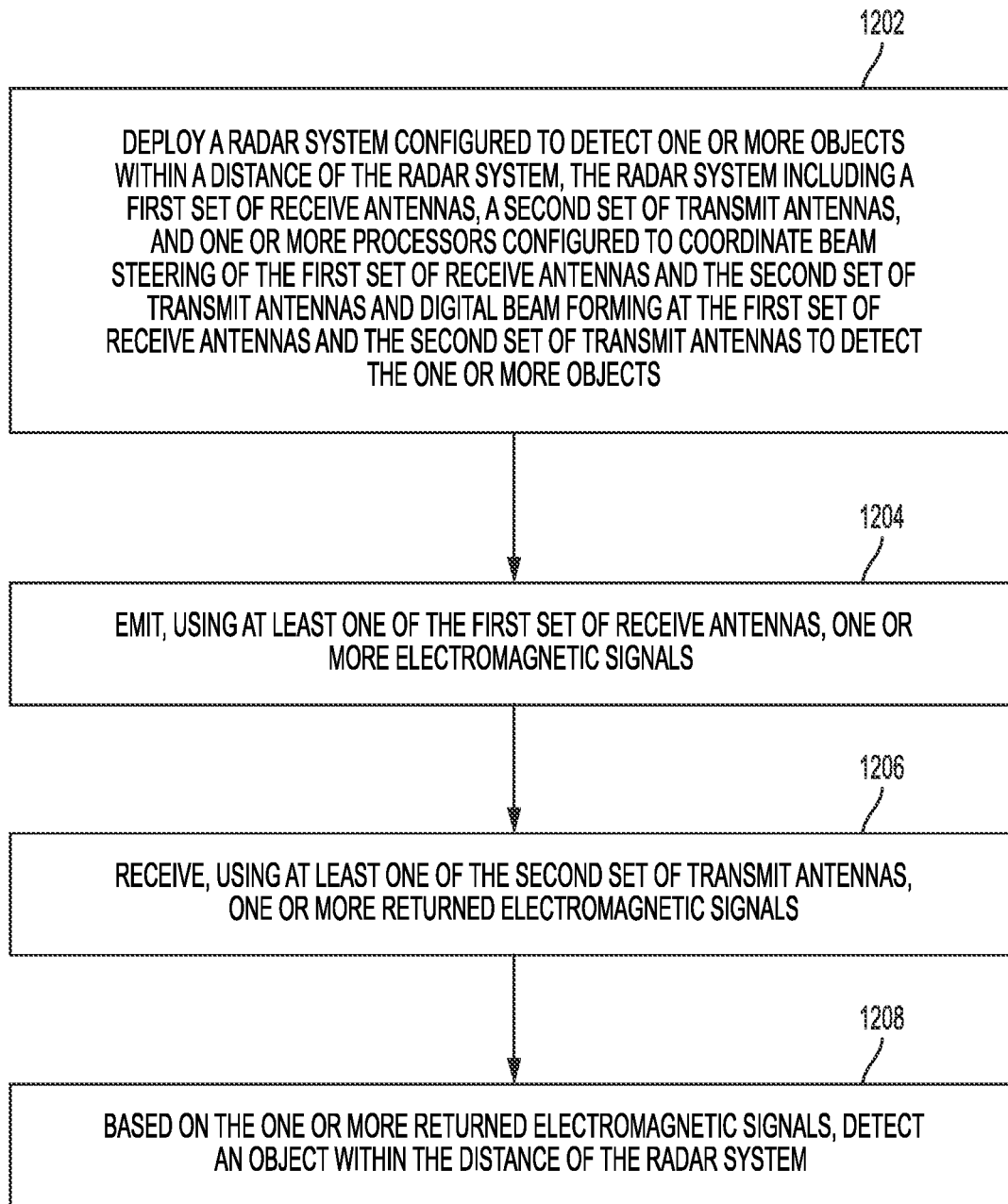
FIG. 12 illustrates an example method for implementing a compact radar system, in accordance with some embodiments.
Figure 13:
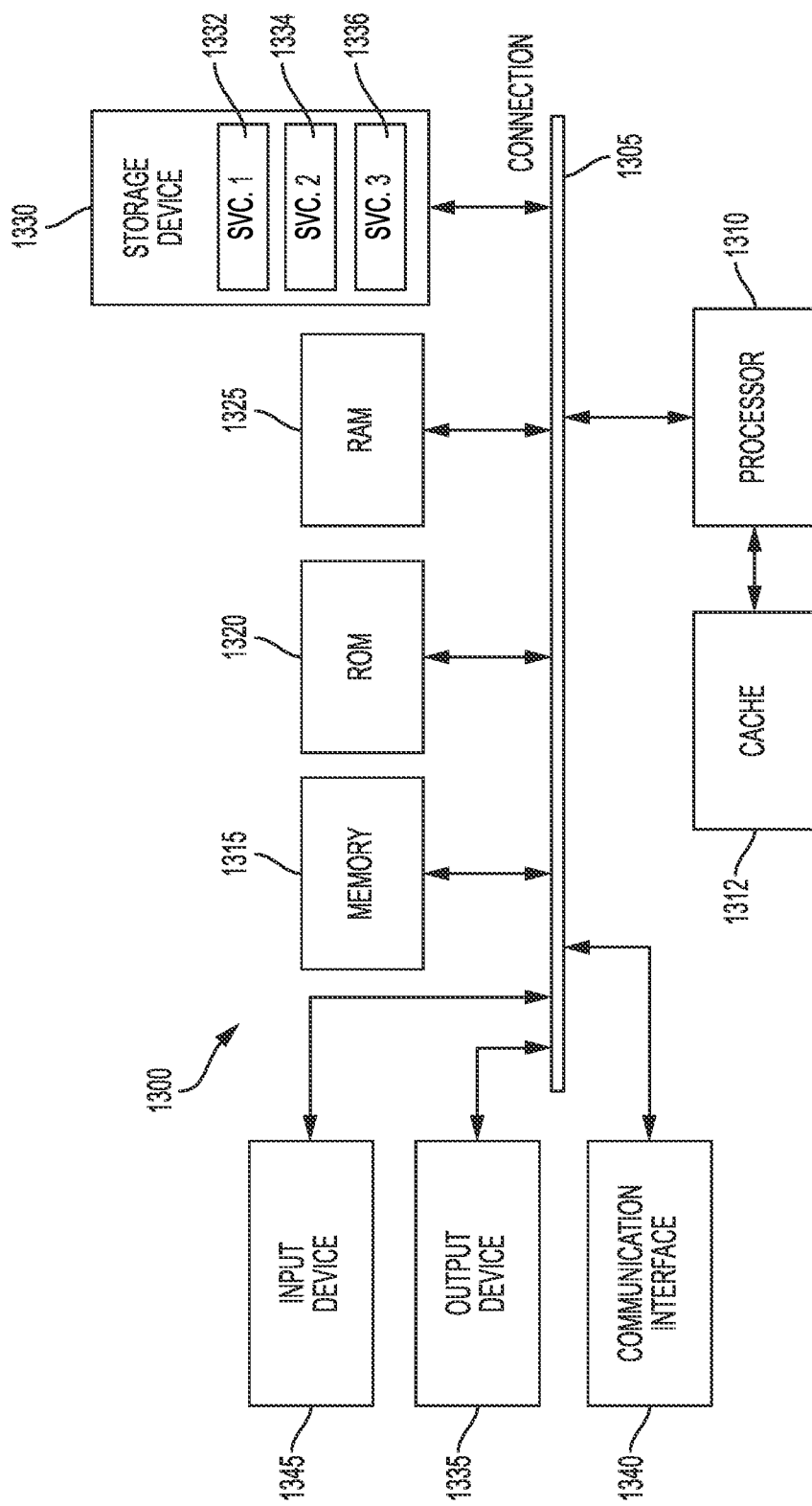
FIG. 13 illustrates an example computer system architecture for an example computing device which can be used to implement computing operations, in accordance with some embodiments.

The present technology will be described in the following disclosure as follows. The discussion begins with a discussion of example configurations and components of a compact radar system, as illustrated in FIGS. 1A through 11. A discussion of a method for implementing a compact radar system, as shown in FIG. 12, will then follow. The discussion concludes with a description of an example computing device architecture, as illustrated in FIG. 13, including example hardware components that can be implemented with the compact radar system or other computing devices in communication with the compact radar system.

The disclosure now turns to FIG. 1A, which illustrates an example configuration of a compact radar system 100. In this example, the compact radar system 100 includes antennas 102. The antennas 102 can include one or more receive antennas and one or more transmit antennas. For example, the antennas 102 can include a plurality of receive antennas and a plurality of transmit antennas, a plurality of receive antennas and a single transmit antenna, a single receive antenna and a single transmit antenna, or a single receive antenna and a plurality of transmit antennas. In some cases, the receive antennas can be monostatic or bistatic antennas, for example.

The compact radar system 100 can include RF (radio frequency) modulation service 104, which can include one or more RF modulator and/or channeling elements. The RF modulation service 104 can perform heat dissipation, RF channel isolation, mechanical vibration reduction, wave propagation, RF modulation (e.g., convert RF signals to a specific format such as a digital format), etc.

The compact radar system 100 can include a processing engine 106. The processing engine 106 can be powered by one or more processors, such as one or more CPUs (central processing units), GPUs (graphics processing units), DSP (digital signal processing units), specialized processing units, etc. The processing engine 106 can execute operations for the compact radar system 100. Non-limiting example operations which can be performed by the processing engine 106 can include signal processing, management and/or control operations (e.g., controlling components and operations in the compact radar system 100, device management, operational management, etc.), object detection operations, storing operations, calculations, data collection operations, monitoring operations, filtering operations, machine learning operations, notification functions, error detection functions, and/or other processing functions.

The compact radar system 100 can include storage 108 for storing data and information such as measurements, notifications, events, instructions, messages, statistics, outputs, inputs, processed data, raw data, logs, etc. The storage 108 can include one or more storage devices, such as storage disks, flash memories, cache, etc. The compact radar system 100 can also include a power 110 element for powering components in the compact radar system 100. The power 110 can include a power storage element such as a battery, a power source (e.g., a power supply, an external power source, etc.), etc. In some cases, the power 110 can include a power switching element to switch power signals from a power origin component to a power destination component.

The compact radar system 100 can include an interface 112, such as an Ethernet interface. The interface 112 can process digital signals and data, and communicate digital signals with other components (internal and/or external).

The compact radar system 100 can also include a switching engine 114, such as an Ethernet switch. The switching engine 114 can switch signals to and from the different antennas 102 in the compact radar system 100. The switching engine 114 can also switch signals to and from other components in the compact radar system 100, such as interface 112, for example.

Figure 1B:
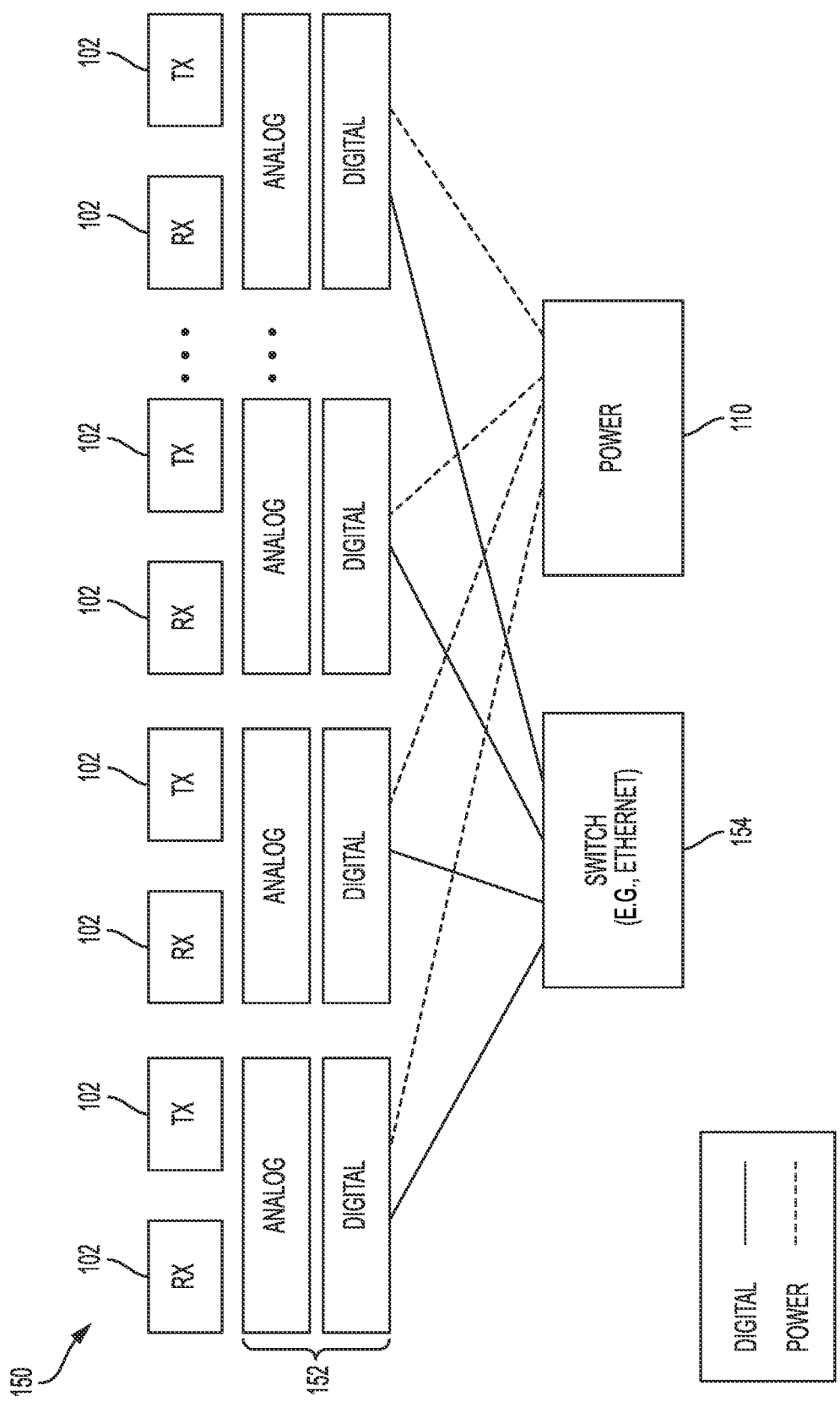
FIG. 1B illustrates an example signal switching configuration which can be implemented by the compact radar system, in accordance with some embodiments.

FIG. 1B illustrates an example signal switching 150 configuration which can be implemented by the compact radar system 100. In this example, signals to and from the antennas 102 can be converted into a proper format (e.g., analog, digital, etc.) in an RF modulation layer 152. RF signals to and from the antennas 102 can be routed to the appropriate destination by a switch 154 (e.g., switching engine 114). On the other hand, power signals can be separately routed by power element 110.

Figure 2:
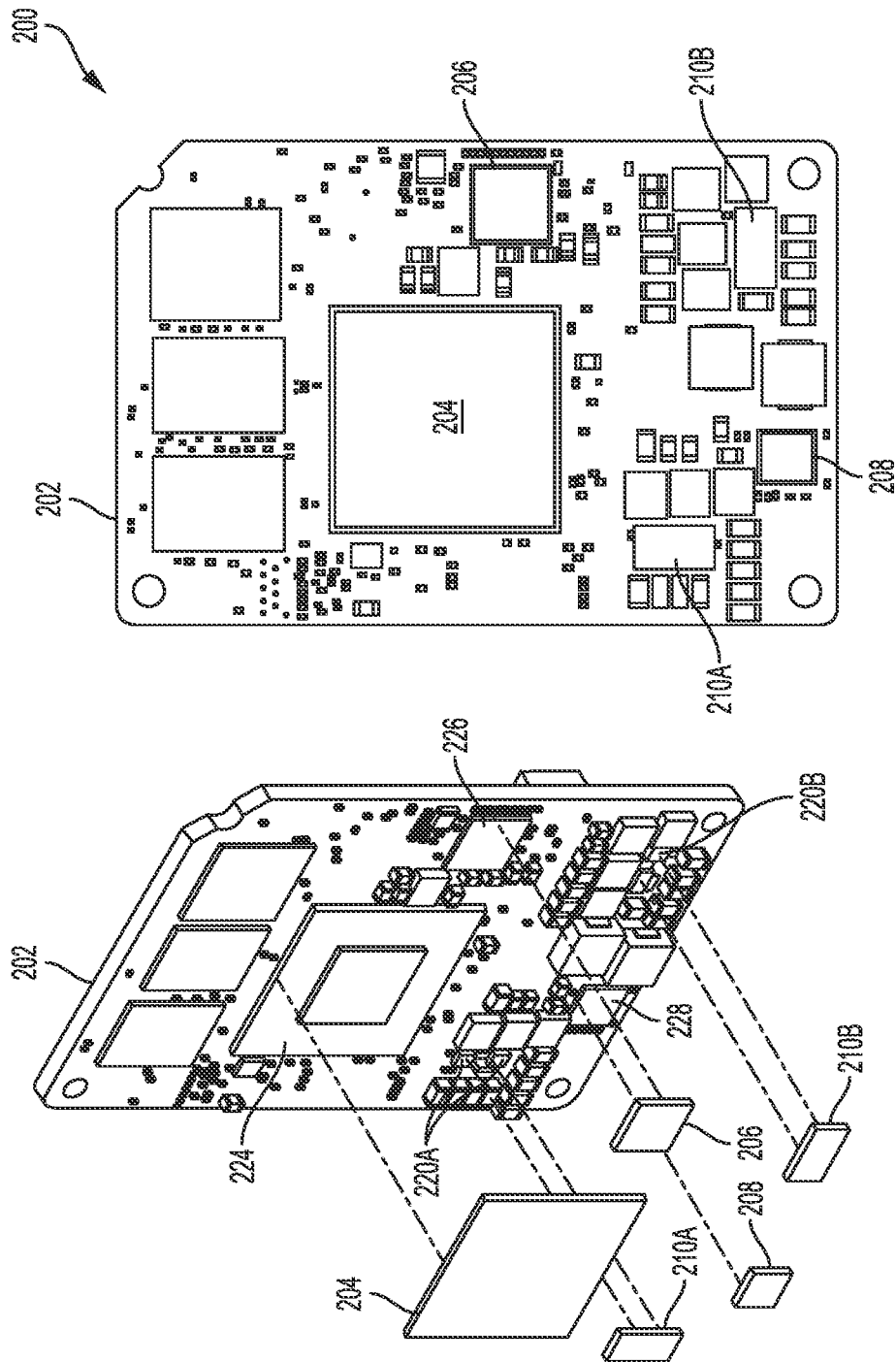
FIG. 2 illustrates an example configuration of a printed circuit board which can be implemented in the compact radar system, in accordance with some embodiments.

FIG. 2 illustrates an example configuration 200 of a printed circuit board (PCB) 202 which can be implemented in the compact radar system 100. The PCB 202 can support and electrically connect components in the compact radar system, such as one or more processors, antennas, radio frequency (RF) channeling modulators, field-programmable gate arrays (FPGAs), analog-to-digital converters, sensors, power components, switches, network interfaces, logic chips, memory and/or storage components, cache, etc. Moreover, the PCB 202 can have various integrated components, such as one or more processors, signaling units, peripherals, interfaces, logic blocks, chips, controllers, memory blocks, cells, sensors, layers, switches, transistors, etc.

The PCB 202 in FIG. 2 is shown relative to thermal pads 204, 206, 208 and 210A-B, which can be attached to thermal pad areas 220A-B, 224, 226, and 228 on PCB 202. For example, thermal pad 210A can be attached to thermal pad area 220A, thermal pad 210B can be attached to thermal pad area 220B, thermal pad 204 can be attached to thermal pad area 224, thermal pad 206 can be attached to thermal pad area 226, and thermal pad 208 can be attached to thermal pad area 228.

The thermal pad areas 220A-B, 224, 226, and 228 can be cleaned (e.g., with isopropyl alcohol) and allowed to air dry before thermal pads 204, 206, 208, and 210A-B are attached to the thermal pad areas 220A-B, 224, 226, and 228.

Thermal pads 204, 206, 208, and 210A-B can include an adhesive on one side and applied to the indicated thermal pad areas 220A-B, 224, 226, and 228. Slight pressure can be applied to thermal pads 204, 206, 208, and 210A-B to facilitate attachment to the thermal pad areas 220A-B, 224, 226, and 228.

The thermal pads 204, 206, 208, and 210A-B can provide thermal relief for the PCB 202 and associated components. The thermal pads 204, 206, 208, and 210A-B can reduce thermal conductivity while maintaining electrical conductivity.

Figure 3A:
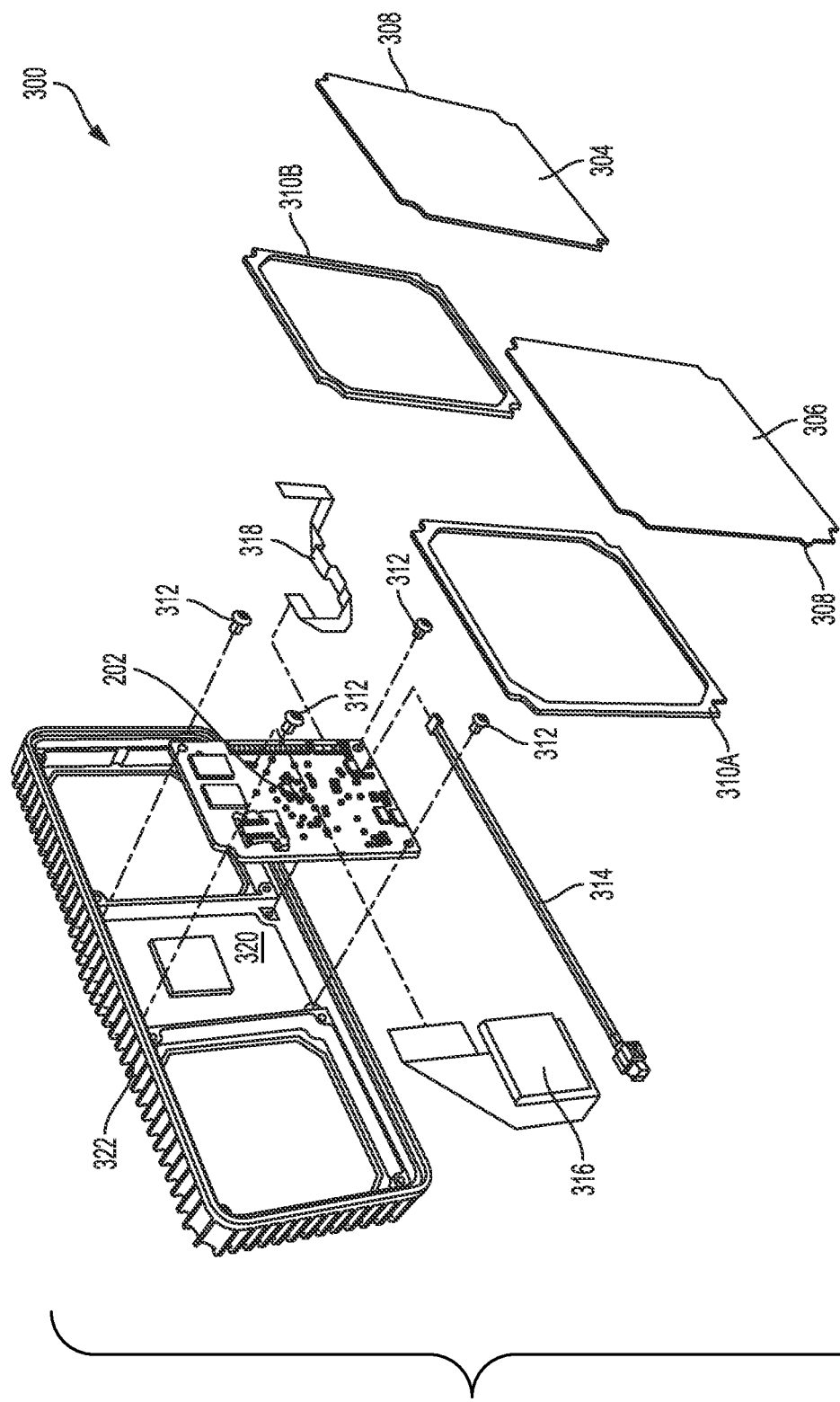
FIG. 3A illustrates an example configuration for mounting a printed circuit board and other radar system components in a front housing of a housing assembly of a compact radar system, in accordance with some embodiments.

FIG. 3A illustrates an example configuration 300 for mounting the PCB 202 and other radar system components in a front housing 322 of a housing assembly. An antenna housing gasket 310A can be used to seal space between the front housing 322 and receive an outer parasitic board 306. Likewise, an antenna housing gasket 310B can be used to seal space between the front housing 322 and transmit parasitic board 304. In some examples, the front housing 322 can be constructed from aluminum and/or other materials.

Anti-seize material (e.g., Loctite) can be applied to threaded holes on the front housing 322. Any excess anti-seize material can be cleaned away (e.g., with a cotton swab). Antenna housing gaskets 310A-B can be inserted into corresponding recessed pockets within the front housing 322. A pick or probe tool can be used to appropriately position a gasket within a corresponding recessed pocket. Receive outer parasitic board 306 can be inserted into a recessed pocket on top of gasket 310A. Transmit parasitic board 304 can be inserted into a recessed pocket on top of gasket 310B.

In some examples, gaskets can be formed in place. Material can be deposited onto the front housing 322 in liquid form and later cured. Such assembly can be efficient and more precise than other gasket techniques. This approach can reduce the total number of separate gaskets and associated unique part numbers required, and allows for more flexibility in the placement of gasket materials, such as a small line of gasket materials adhered to the front housing 322.

Gaskets perform multiple functions, including but not limited to, heat dissipation, mechanical compliance to account for machining tolerances while maintaining a seal, electrical isolation, vibration dampening, forming a barrier to water and dust, etc.

Elements etched into receive outer parasitic board 306 and transmit board 304 can be positioned to face inside the device (i.e., away from the front housing 322). Alignment keys 308 can be used to assist with insertion of receive outer parasitic board 306 and transmit board 304 respectively. A power board cable assembly 314 can also be connected to PCB 202.

The PCB 202 with connected flex cables 316 and 318 and power board cable assembly 314 can be inserted into a cavity 320 in the front housing 322. Securing elements 312, such as screws (e.g., stainless M3×5 mm socket button head cap screws) can be used to secure PCB 202 to the front housing 322. The securing elements 312 can be tightened using a specific torque value, such as a torque value of 11 in-lbs, to ensure proper attachment without damage.

Figure 3D:
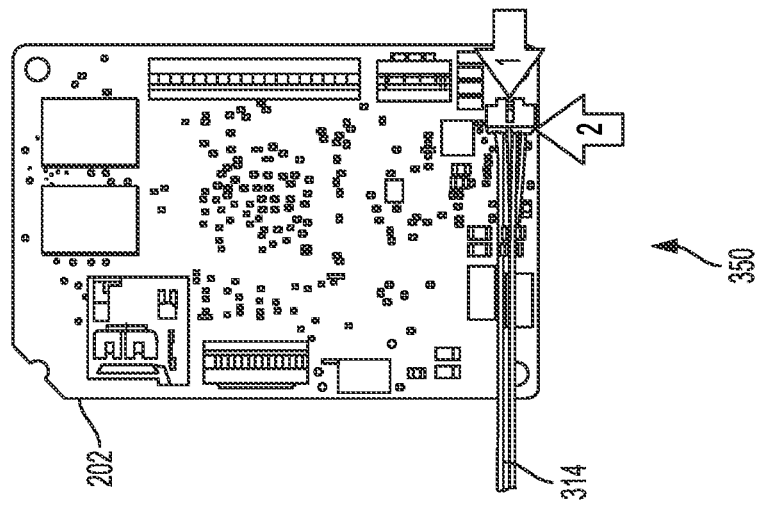
FIGS. 3B through 3D illustrate example configurations of a printed circuit board, flex cables and a power board cable for a compact radar system, in accordance with some embodiments.
Figure 3C:
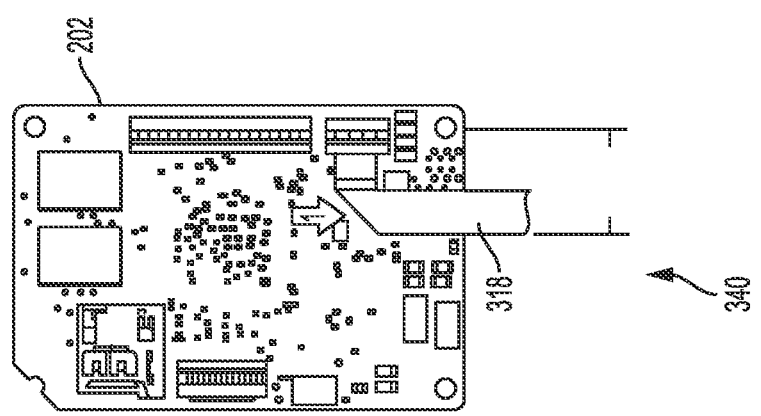
Figure 3B:
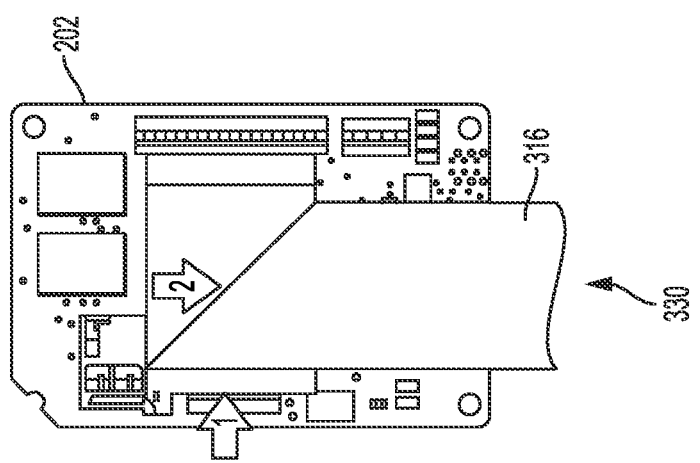

FIGS. 3B-D illustrate example configurations 330, 340, 350 of the PCB 202 and the flex cables 316, 318 and power board cable 314. Turning first to FIG. 3B, flex cable 316 in configuration 330 can be folded back onto itself (arrow 1) at approximately 30 mm (or another appropriate distance). Flex cable 316 can then be folded at, for example, 45 degrees (arrow 2) so the flex cable 316 can exit out at the bottom of the PCB 202.

Turning to FIG. 3C, in configuration 340, flex cable 318 can be folded at, for example, a 45 degree angle (arrow 1) at approximately 16.5 mm (or any other appropriate distance) so the flex cable 318 can exit out at the bottom of the PCB 202. With reference to FIG. 3D, power board cable assembly 314 can be plugged into a corresponding housing on PCB 202 (arrow 1). In some cases, adhesive can be applied between the connector and connector housing (arrow 2), and allowed to cure to ensure the connection is maintained during operation.

Figure 4:
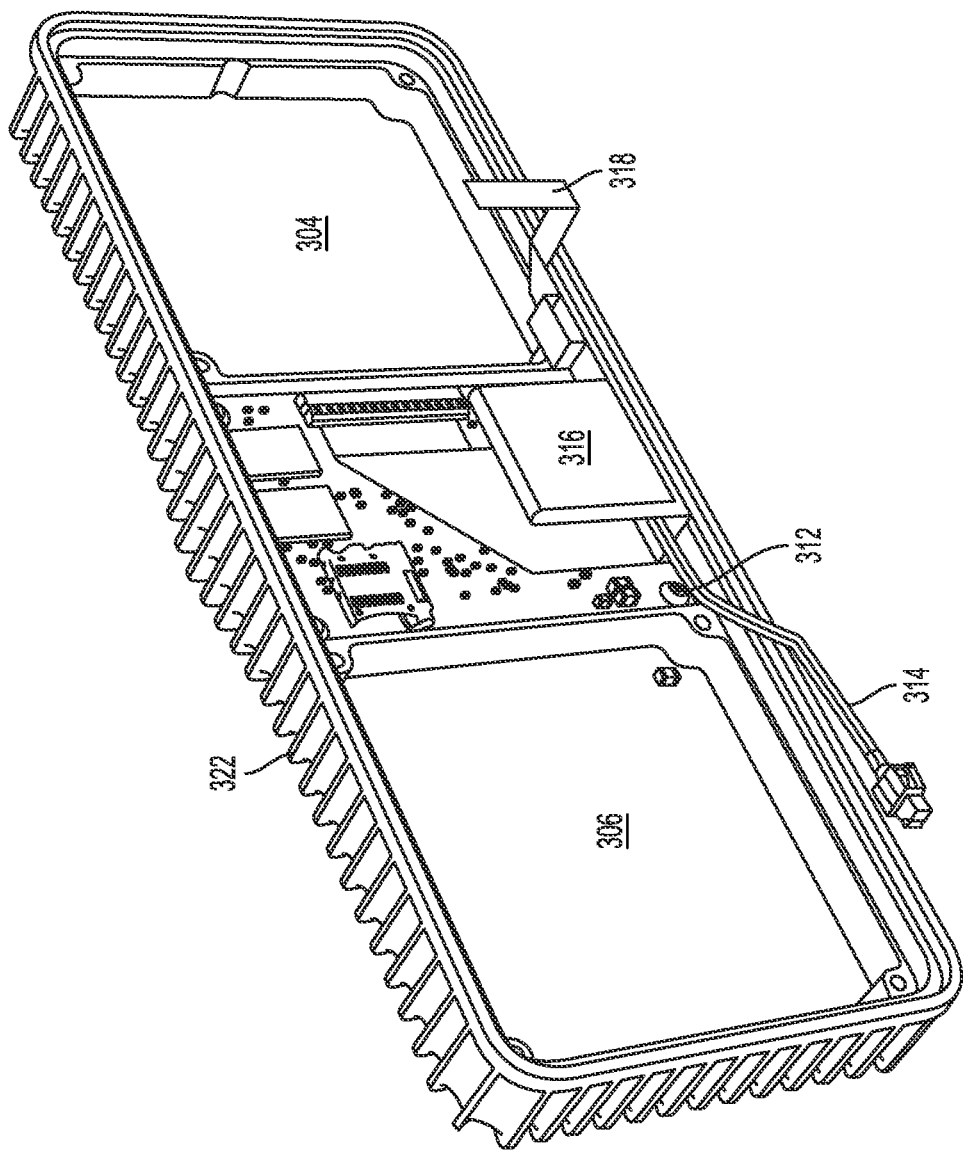
FIG. 4 illustrates a printed circuit board, a receive outer parasitic board, and a transmit parasitic board inserted into and/or attached to a front housing of a housing assembly of a compact radar system, in accordance with some embodiments.

FIG. 4 illustrates the PCB 202, the receive outer parasitic board 306, and the transmit parasitic board 304 inserted into and/or attached to the front housing 322. In this example, the PCB 202 is secured into the cavity 320 on the front housing 322 by by the securing elements 312 (e.g., screws). Flex cables 316, 318 and power board cable 314 are connected to the PCB 202 in the front housing 322.

Figure 5A:
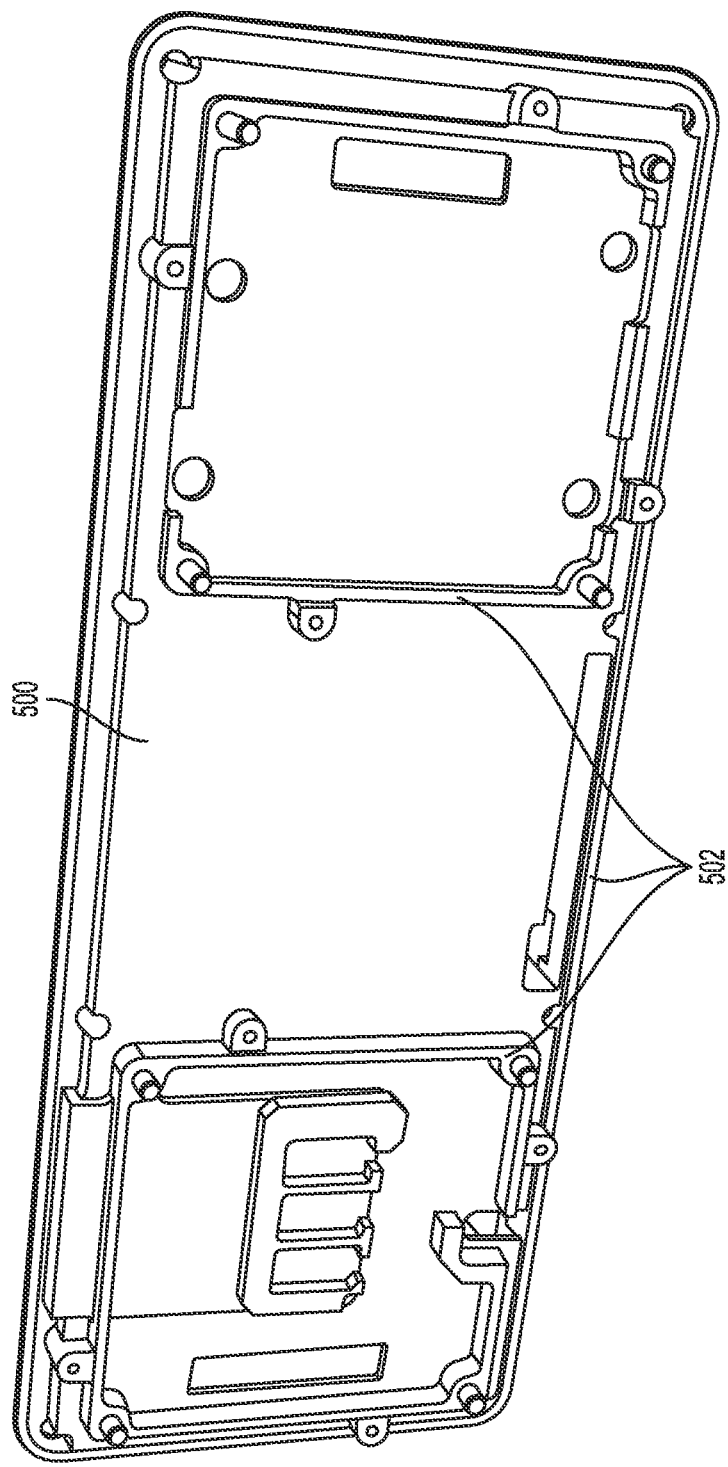
FIG. 5A illustrates an example radio frequency modulator which can be implemented in a compact radar system, in accordance with some embodiments.

FIG. 5A illustrates an example radio frequency (RF) modulator 500 which can be implemented in a compact radar system as described herein. The RF modulator 500 can perform various functions including, without limitation, heat dissipation, RF channel isolation, mechanical stability for eliminating vibration effects, constraining wave propagation modes, signal modulation or conversion, etc. The RF modulator 500 can be electronically connected to the PCB 202 and other components as shown in FIG. 5B.

Surfaces 502 can be cleaned (e.g., using a cotton swab with isopropyl alcohol) and allowed to air dry. Thermal gel can be applied to the surfaces 502, including around the perimeters and depicted posts. In some cases, a syringe or dispensing gun can be used to apply a thin bead of thermal gel on the surfaces 502. Anti-seize material (e.g., Loctite) can be applied to threaded holes on the RF modulator 500. Any excess anti-seize material can be cleaned away (e.g., with a cotton swab).

FIG. 5B illustrates an arrangement 510 for connecting or attaching various components, including the RF modulator 500, to the PCB 202, the receive outer parasitic board 306, and the transmit parasitic board 304, in the front housing 322. In this example, a transmit printed circuit board (PCB) 516, including connectors 524 and 520, is attached to the RF modulator 500. A transmit support frame 528 is placed over transmit the PCB 516. Guide posts on the RF modulator 500 can be used for alignment. Securing elements 312 (e.g., screws such as stainless M2×4 mm socket button head cap screws) can be used to secure the support frame 528 and the transmit PCB 516 to the RF modulator 500. When secured, the connectors 524 and 520 are accessible via openings in the RF modulator 500.

Thermal pads 526 can be attached to a receive printed circuit board (PCB) 514 using previously described mechanisms. The receive PCB 514 (with thermal pads 526) can be attached to the RF modulator 500. The receive PCB 514 includes connectors 522 and 518. An inner support frame 530 can be placed over the receive PCB 514. A receive inner parasitic board 532 can be placed over the inner support frame 530. A receive support frame 502 can be placed over the receive inner parasitic board 532. Guide posts on RF modulator 500 can be used for alignment. Securing elements 312 can be used to secure the receive support frame 502, the receive inner parasitic board 532, the inner support frame 530, and the receive PCB 514 to the RF modulator 500. When secured, the connector 522 is accessible via opening 512 in RF modulator 500. Moreover, the connectors 518 can be also accessible via openings 518A-D.

Figure 5C:
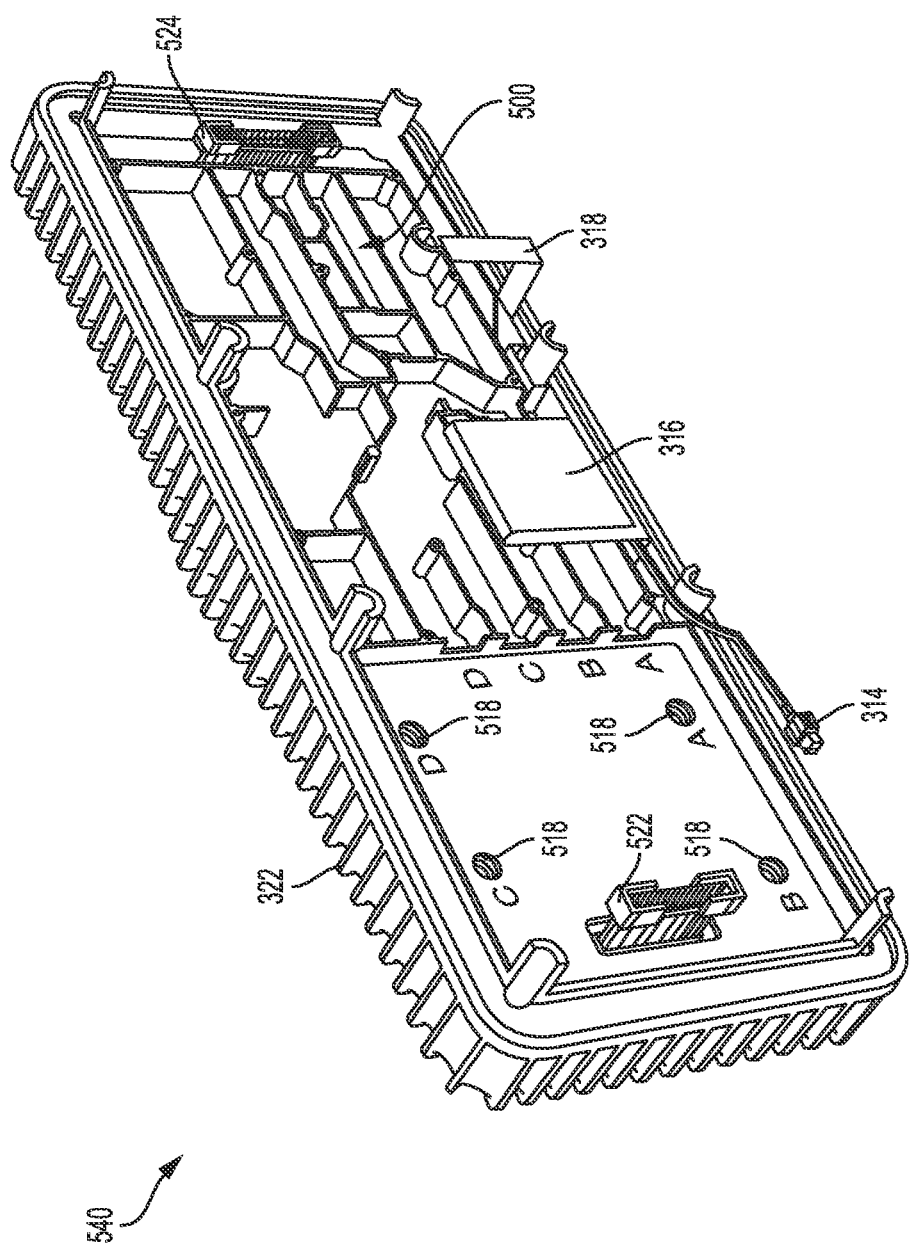
FIG. 5C illustrates a radio frequency modulator inserted into a front housing of a housing assembly of a compact radar system, in accordance with some embodiments.

The RF modulator 500 and the attached components can be inserted into, or attached to, the front housing 322. FIG. 5C illustrates the RF modulator 500 inserted into the front housing 322. As depicted, flex cables 316, 318 and power board cable assembly 314 are outside of the RF modulator 500. Connectors 522 and 524 extend outside of the RF modulator 500. Connectors 518 are accessible via openings 518A-D. Connector 520 is also accessible via an opening which is not visible in FIG. 5C.

Figure 5D:
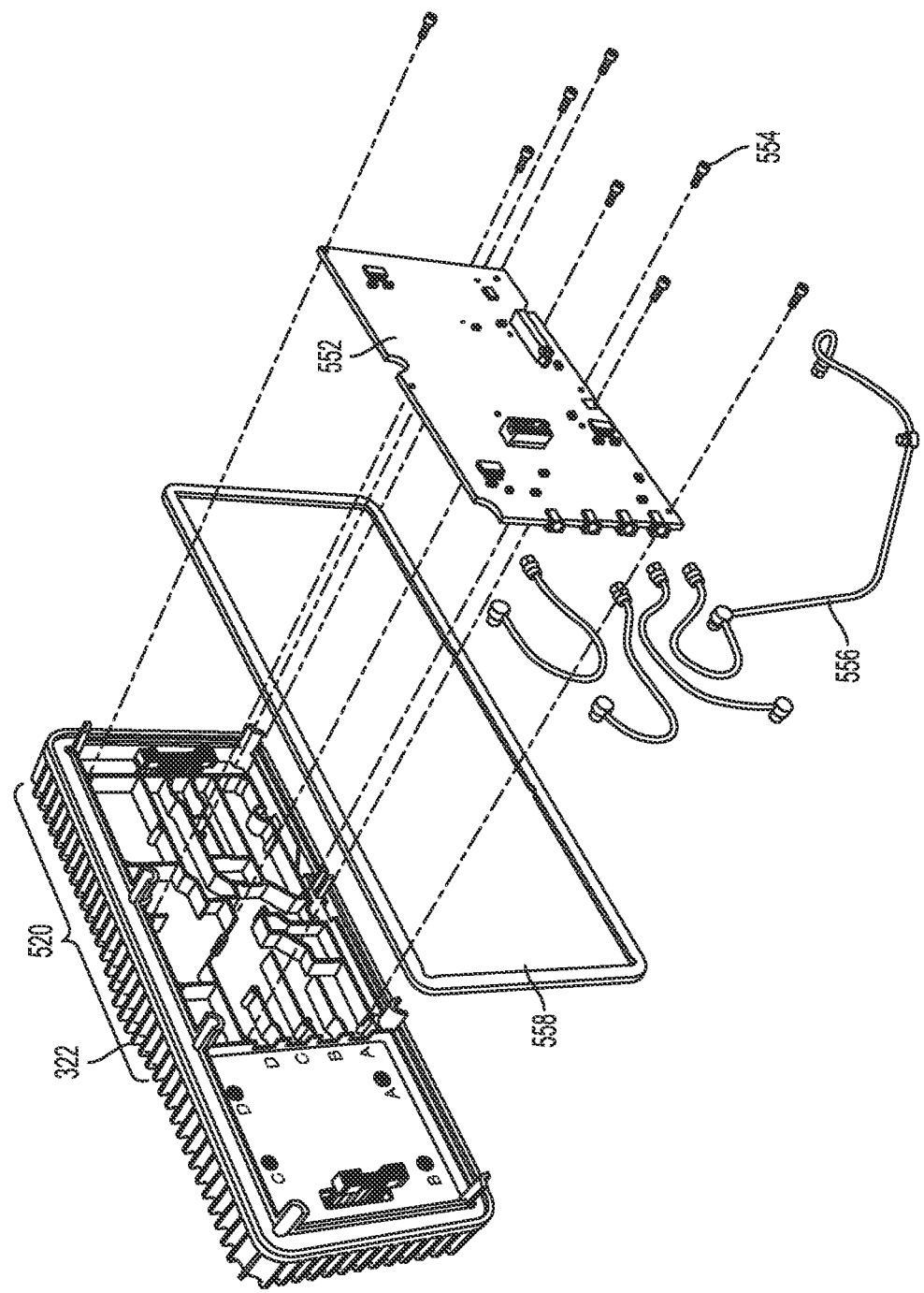
FIG. 5D illustrates a diagram for securing a support frame and transmit printed circuit board to a radio frequency modulator in a compact radar system, in accordance with some embodiments.

With reference to FIG. 5D, securing elements 554 (e.g., screws such as stainless M2×4 mm socket button head cap screws) can be used to secure the support frame 528 and transmit PCB 516 to the RF modulator 500. When secured, connectors 524 and connector 520 are accessible via openings in the RF modulator 500.

Figure 7A:
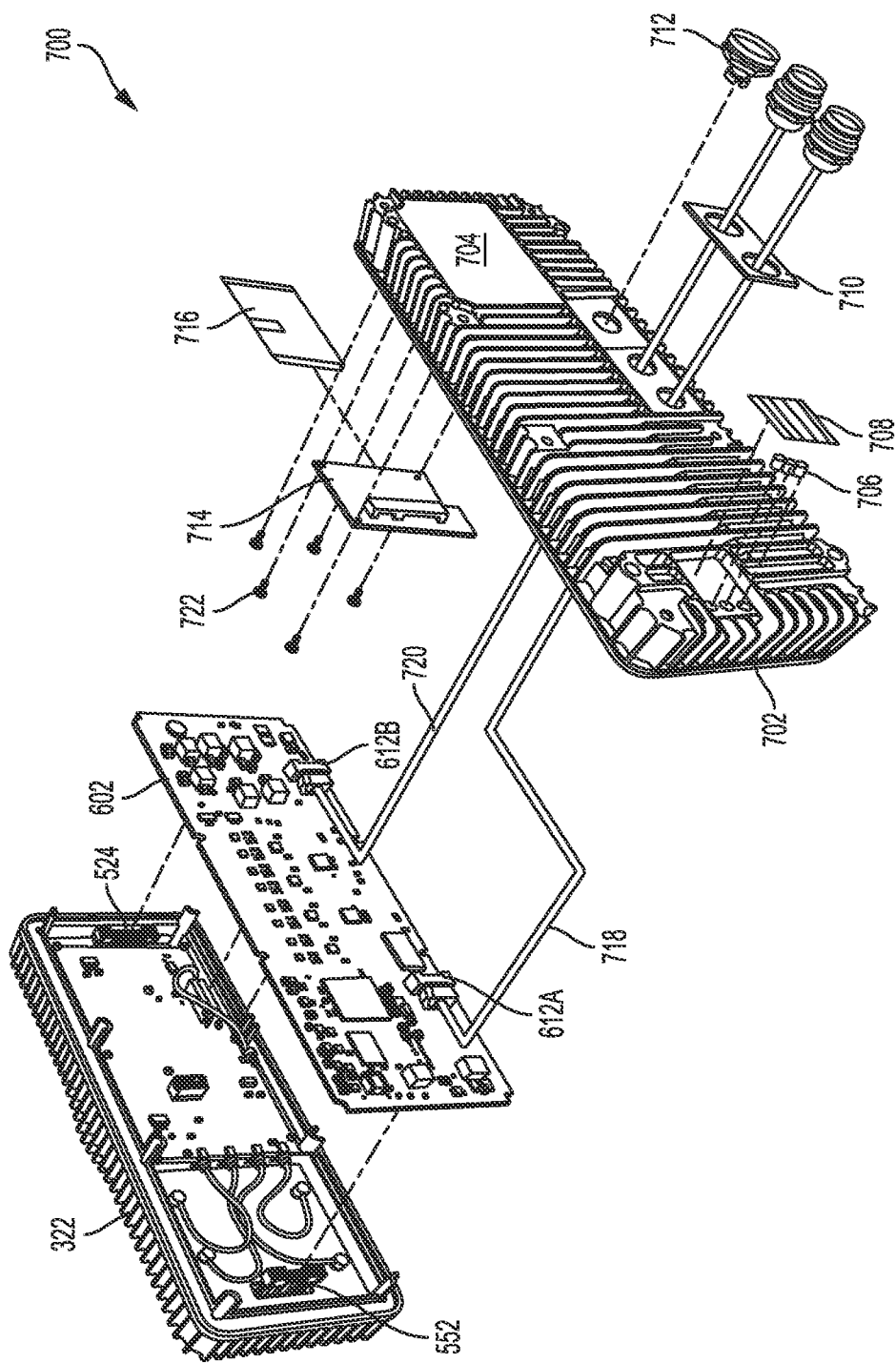
FIG. 7A illustrates an example configuration of various radar system components enclosed within a front housing and a back housing of a housing assembly, in accordance with some embodiments.

Moreover, a gasket 558 can be placed around the edge of the RF modulator 500. Gasket 558 can environmentally seal the inside of the front housing 322, as well as any components inside the back housing 702 as shown in FIG. 7A. Gasket 558 can also protect components inside the front housing 322 (as well as any components inside the back housing 702 as shown in FIG. 7A) from moisture, dust, particles, etc. Accordingly, the RF modulator 500 can be built into the housing of a compact radar system (e.g., radar system 100).

Radio Frequency (RF) Printed Circuit Board (PCB) 552 can be aligned into section 520 of the front housing 322. Securing elements 554, such as screws, can be used to secure RF PCB 552 to section 520 of the front housing 322. One end of each of RF cable assemblies 556 can be connected to corresponding connectors on RF PCB 552. The other end of four of the RF cable assemblies 556 can be connected to corresponding RF connectors 518 of receive printed circuit board (PCB) 514. The other end of one of the RF cable assemblies 556 can be connected to RF connector 520 of transmit printed circuit board (PCB) 516. In some cases, RF cables are eliminated by direct board to board RF interconnects.

Figure 5E:
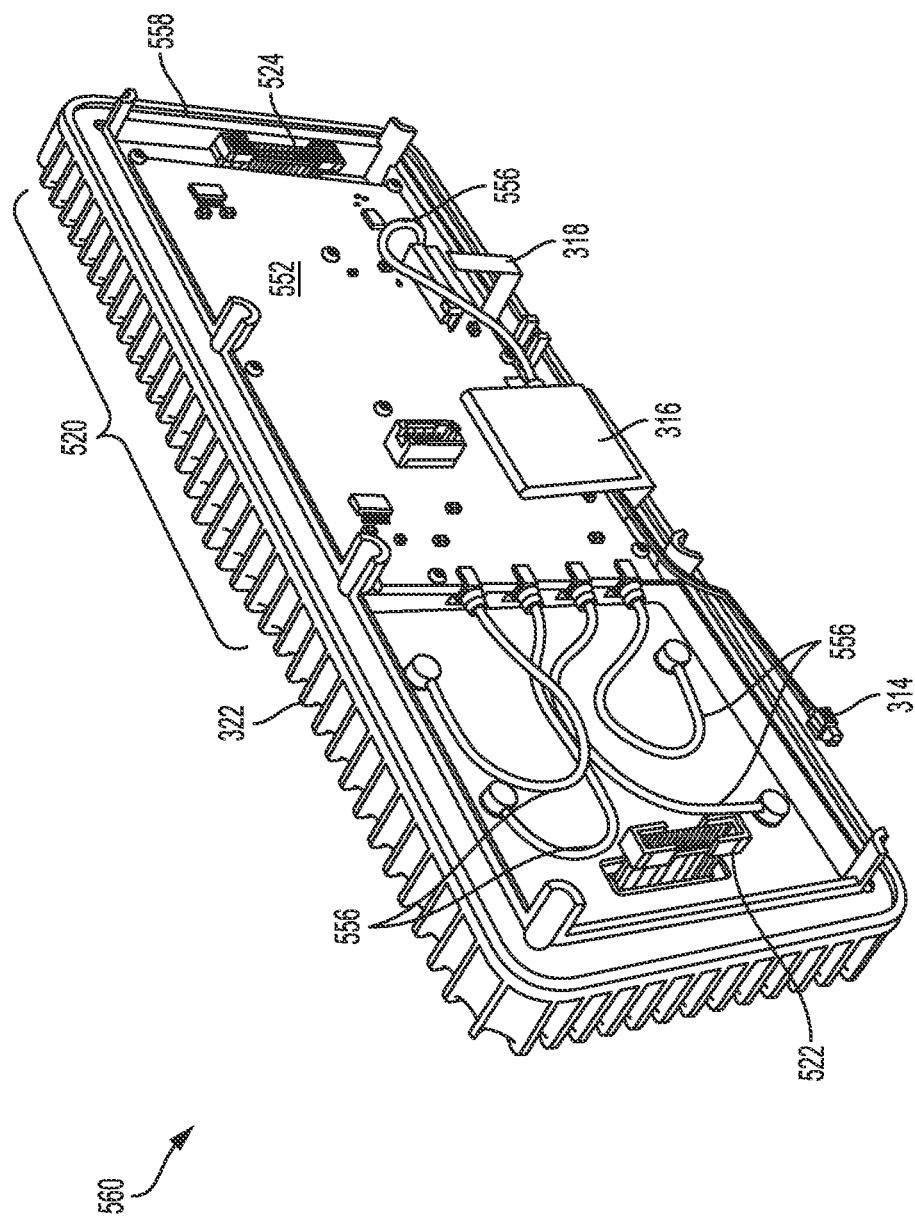
FIG. 5E illustrates a radio frequency printed circuit board attached within a section of a front housing of a compact radar system, with various connections of radio frequency cable assemblies, in accordance with some embodiments.

Each RF cable assembly (556) can correspond to an antenna. For example, one RF cable assembly can connect to a transmit antenna and four RF cable assemblies can connect to four receive antennas. Other examples can include more or less RF cable assemblies (556) corresponding to more or less transmit and/or receive antennas. FIG. 5E illustrates the RF PCB 552 attached within section 520 of the front housing 322, with appropriate connections of RF cable assemblies 556.

Figure 6:
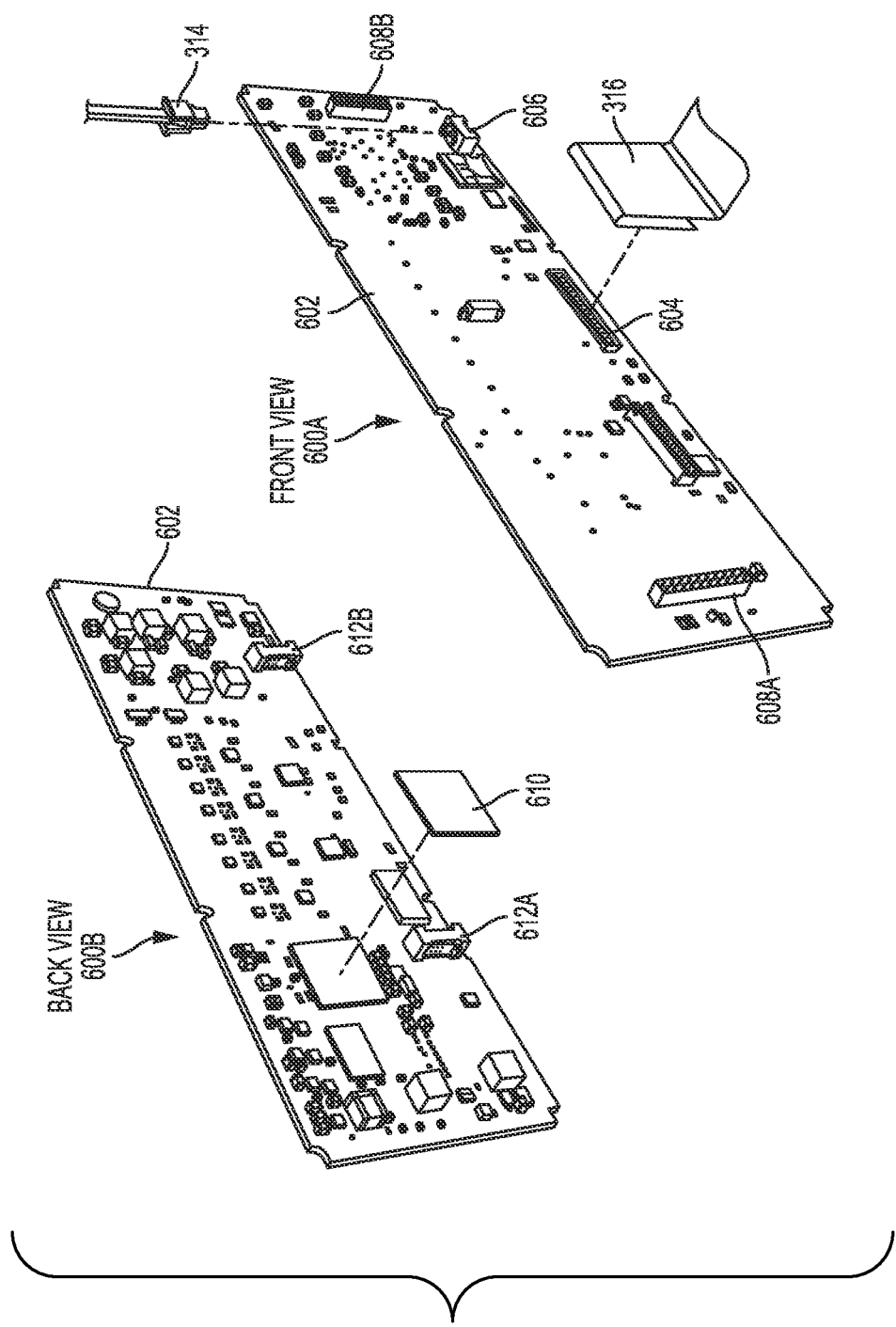
FIG. 6 illustrates a front view and a back view of a main printed circuit board in a compact radar system, in accordance with some embodiments.

FIG. 6 illustrates a front view 600A and a back view 600B of the main Printed Circuit Board (PCB) 602. Thermal pad 610 can be connected to main PCB 602 in the indicated area (using described mechanisms). Flex cable 316 can be connected to main PCB 602 using connector 604. Power board cable assembly 314 can also be connected to main PCB 602 using connector 606. Main PCB board 602 includes connector 608B for connecting to connector 522 and connector 608A for connecting to connector 524. Main PCB board 602 also includes connector 612A that facilitates Ethernet connections and connector 612B that facilitates power connections.

FIG. 7A illustrates an example configuration 700 of various radar system components enclosed within the front housing 322 and the back housing 702. A storage element 716, such as an mSATA Solid State Drive (SSD) card, can be attached to storage PCB 714. Securing elements 722, such as screws, can be used to secure the storage PCB 714 and the storage element 716 to the back housing 702. The back housing 702 can be constructed, for example, from aluminum and/or other materials.

Connectors 608A-B (not visible in FIG. 7A) are connected to connectors 552 and 554 respectively to secure main PCB 602 to the assembly (322 and 702). Internal Ethernet panel receptacle cable assembly 718 is connected to connector 612A, and internal power panel receptacle cable assembly 720 is connected to connector 612B. Input label 710 can label internal Ethernet panel receptacle cable assembly 718 and internal power panel receptacle cable assembly 720. A protective vent 712 can be attached or snapped into the back housing 702. Lights 706 (e.g., press-fit, panel mount, light pipe, flush, 3 mm, LED, etc.) can be attached to the back housing 702. Lights 706 can indicate the status of components including receive and transmit antennas. System status label 708 can be used to indicate the meaning of different combinations of lights 706 when illuminated. Other labels, such as manufacturer, serial number, model number, power input characteristics, error codes, etc., can be attached in label area 704.

Figure 7B:
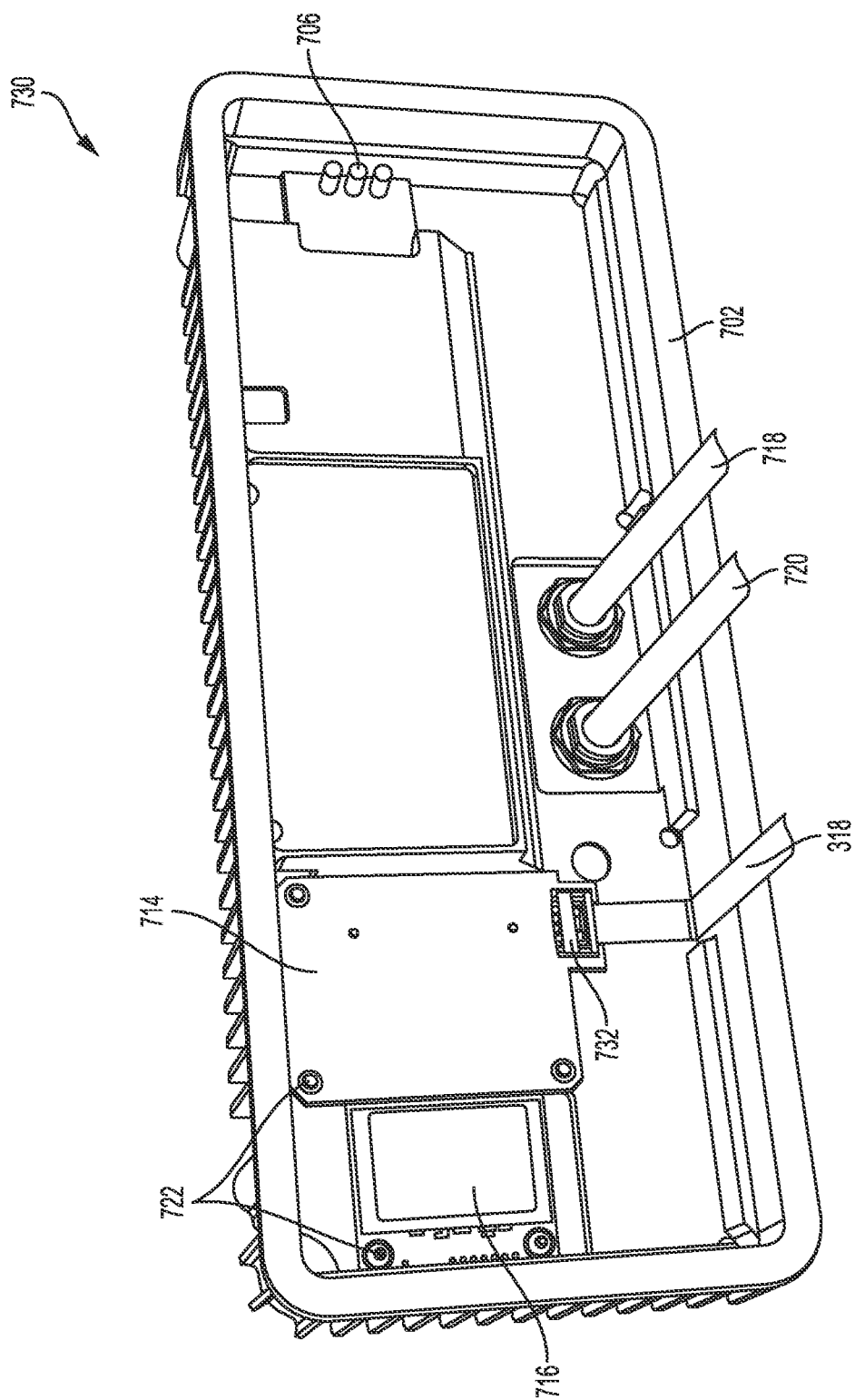
FIG. 7B illustrates an example inside view of a back housing of a housing assembly of a compact radar system, in accordance with some embodiments.

FIG. 7B illustrates an example inside view 730 of the back housing 702. As depicted, securing elements 722 can secure storage PCB 714 and storage element 716 to the back housing 702. Connector 732 can be used to connect flex cable 318 to storage PCB 714.

Figure 8A:
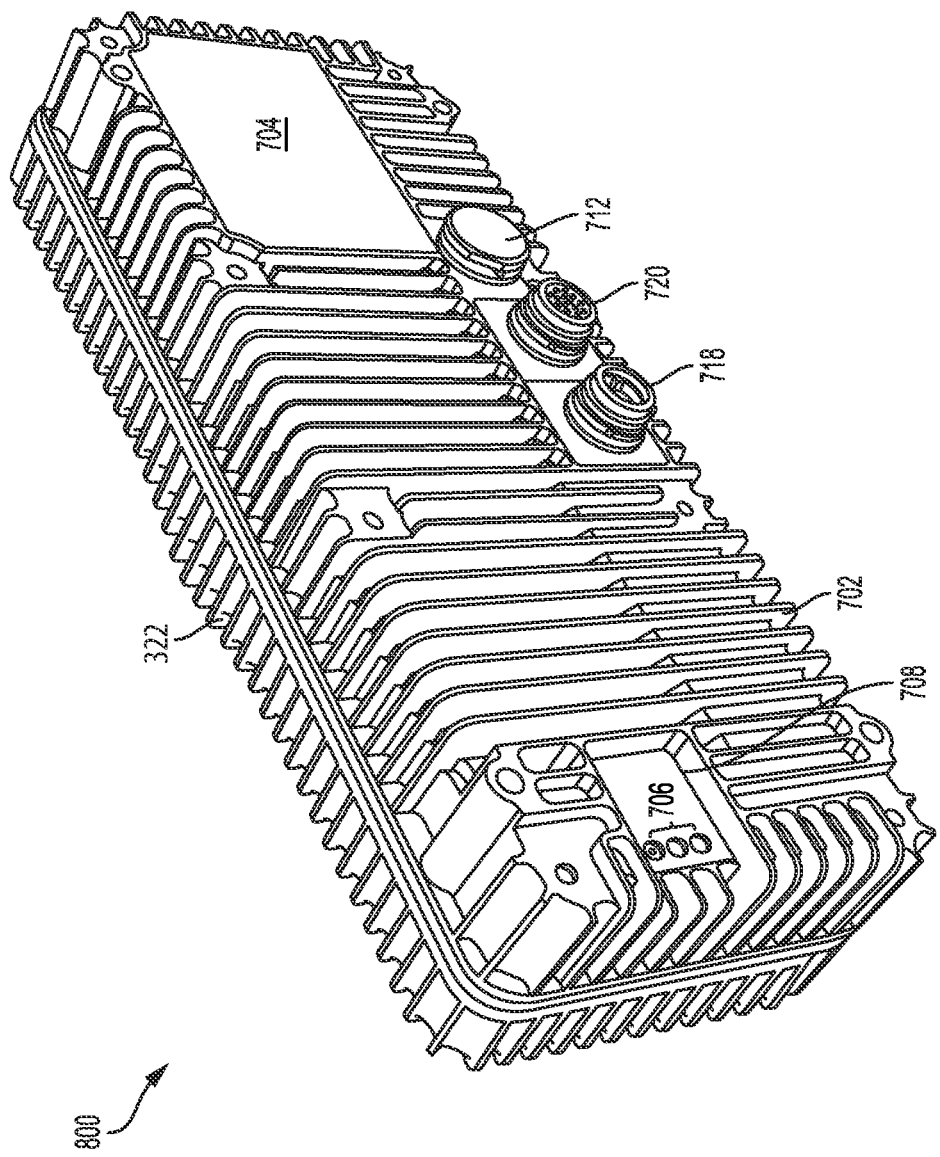
FIG. 8A illustrates an example assembled view of a radar system with a front housing attached to a back housing to form an enclosed housing assembly, in accordance with some embodiments.

FIG. 8A illustrates an example assembled view 800 of radar system 100 with front housing 322 attached to back housing 702 to form an enclosed housing assembly containing the various components described herein. The lights 706 and system status label 708 can be visible from the outside of the back housing 702. The label area 704 and any labels included in the label area 704 can also be visible from the outside of the back housing 702.

The internal Ethernet panel receptacle cable assembly 718 and internal power panel receptacle cable assembly 720 can be accessible from the outside of the back housing 702, which can be used to connect to external power and Ethernet devices. The protective vent 712 can also extrude from the outside of the back housing 702.

Figure 8B:
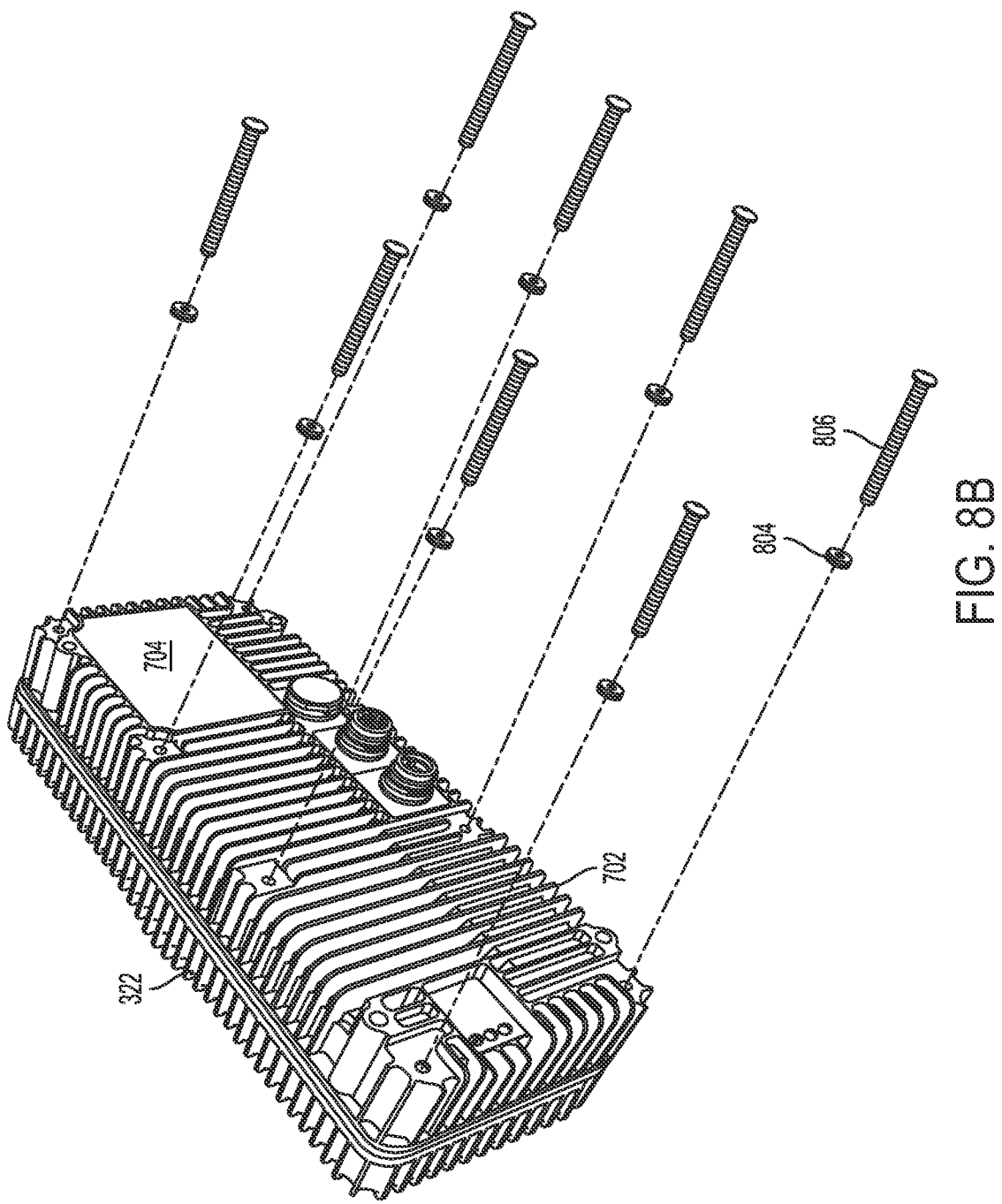
FIG. 8B illustrates a diagram for securing a front housing and a back housing to form an enclosed housing assembly, in accordance with some embodiments.

Turning to FIG. 8B, securing elements 806 and 804, such as screws and washers, can be used to secure the front housing 322 and back housing 702 together. In some cases, the securing elements 806 are stainless M3×35 mm, socket button head cap screws and the securing elements 804 are 3 mm ID×6.35 mm OD bonded neoprene sealing washers.

Figure 8C:
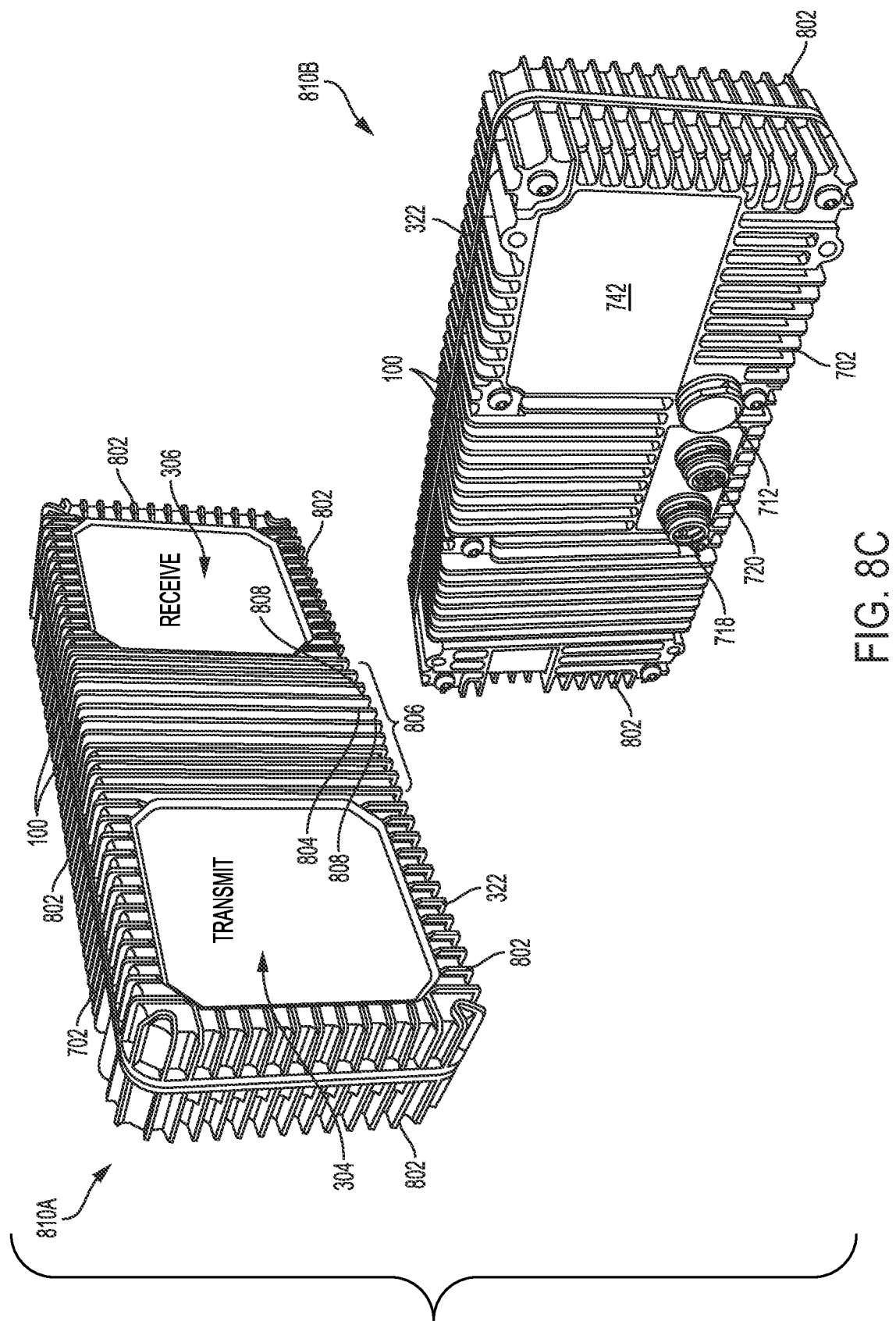
FIG. 8C illustrates a front view and a rear view of a compact radar system according to an example completed assembly, in accordance with some embodiments.

FIG. 8C illustrates a front view 810A and a rear view 810B of the compact radar system 100 with the completed assembly (322 and 702) and components. Radar signals are transmitted via transmit parasitic board 304 shown in the front view 810A, and returned signals are received via receive outer parasitic board 306 shown in the front view 810A.

Compact radar system 100 can utilize bi-static radar mechanisms. In some examples, compact radar system 100 transmits Frequency-Modulated Continuous Wave (FMCW) radar signals and measures FMCW radar returns. Compact radar system 100 can operate across any of a variety of frequency bands. For example, compact radar system 100 can operate in the X band, Ku band, Ka band, or even higher frequencies. Operational frequency can be selected to balance considerations including, but not limited to, atmospheric attenuation, material costs, component costs, power efficiency, antenna physical size, etc. In some examples, compact radar system 100 operates in the Ku band including frequencies ranging from 13 GHz to 17 GHz.

Compact radar system 100 can be mounted or attached to an object such as a vehicle, a tower, a building, an airplane, a boat, a drone, a moving or propelled object, etc. For example, the compact radar system 100 can be mounted on an Unmanned Aerial Vehicle (UAV). In some cases, the compact radar system can implement one or more Field Programmable Gate Arrays (FPGAs), Graphical Processing Units (GPUs), Central Processing Units (CPUs), digital signal processing units (DSPs), etc., for compute and signal processing. FPGAs can provide real time (high speed) low level hardware control and high speed serial signal processing for multiple receive antennas prior to an adaptive detection algorithm implementation, which can be highly parallelized in a processor such as a GPU. Parallelized processor (e.g., GPU, CPU, etc.) functions can include detection, classification, tracking, machine learning, event generation, control functions, error correction, communication, data storage or manipulation, etc.

A combination of processors, such as CPUs, can be utilized for various aspects of control and monitoring of functions and data flow. A GPU and FPGA can use shared memory space to pass data between a data acquisition function at the FPGA and a signal processing functions at the GPU. Use of shared memory minimizes data transfers and required memory, and limits latency.

The external surfaces of the housing components (e.g., 322 and 702) of the compact radar system 100 can include fins 802. The fins 802 can be configured with an increased surface area or other patterns to dissipate heat.

The arrangement of fins 802 in area 806 of the front view 810A (i.e., the area between transmit board 304 and receive board 306) can also be tailored as a wave guide to guide radar transmissions from transmit board 304 away from (or past) receive board 306. Having the fins 802 in area 806 tailored as a wave guide promotes isolation between transmit board 304 and receive board 306, and mitigates leakage of radar signals from transmit board 304 and receive board 306. As such, signals received at receive board 306 are more likely to be radar returns than leakage from transmit board 304.

Fin 804 can extend slightly further from the external surface of front housing 322 than adjacent fins 808. Fins 808 can extend slightly further from the external surface of the front housing 322 than the next adjacent fins closer to transmit board 304 and receive board 306. Each fin in area 806 closer to transmit board 304 and receive board 306 can extend slightly less than adjacent fins that are further from transmit board 304 and receive board 306. The height arrangement of fins in area 806 can guide radar transmissions from transmit board 304 past receive board 306.

The spacing, length, and width of the fins can be selected to optimize the isolation between transmit board 304 and receive board 306, so the range of radar detection is not degraded. Thus, fins in area 806 can have the dual purpose of dissipating heat and preventing leakage of transmitted radar signals back into receive board 306.

Figure 8D:
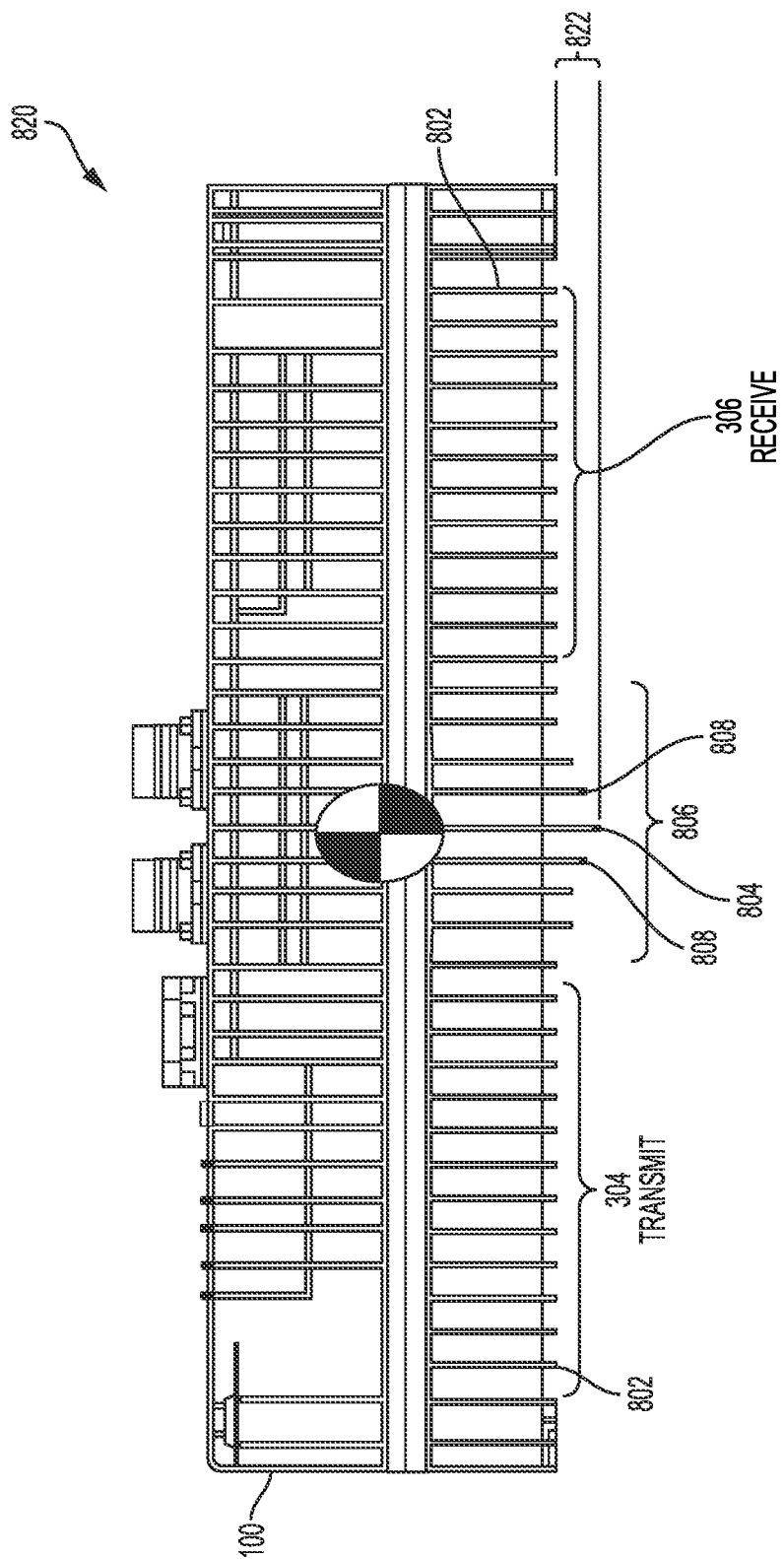
FIG. 8D illustrates a top view of a compact radar system, in accordance with some embodiments.

FIG. 8D illustrates a top view 820 of compact radar system 100. As depicted, fins in area 806 extend further from the body of compact radar system 100 than fins 802. Fin 804 extends the furthest and slightly further than fins 808. Other fins can taper to the fins 802. The extent (e.g., 822) of the fins 804, 808 and the fin area 806 can be configured to reduce radar transmissions from transmit board 304 going into receive board 306.

Figure 9A:
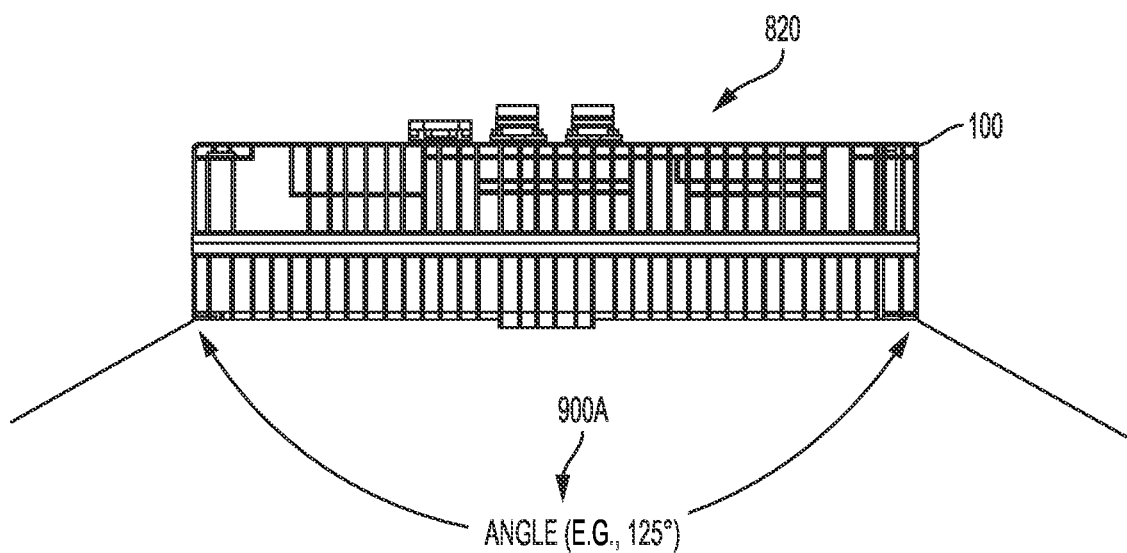
FIGS. 9A and 9B illustrate a top view and a side view of compact radar system, in accordance with some embodiments.
Figure 9B:
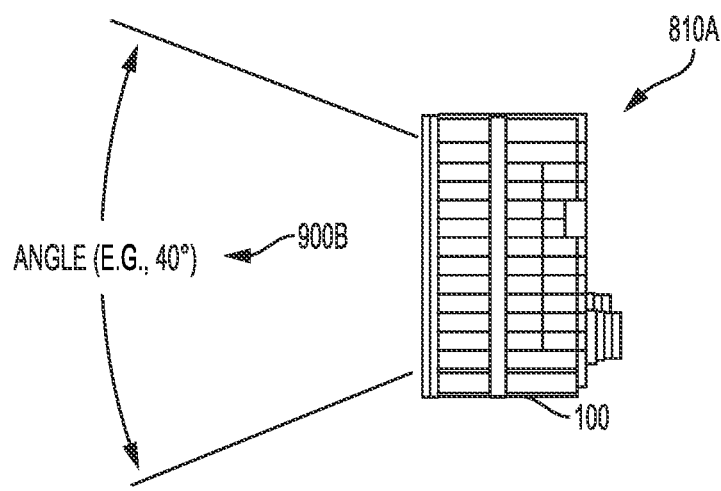

FIGS. 9A and 9B illustrate a top view 820 and a side view 810A of compact radar system 100. The top view 820 in FIG. 9A depicts an example coverage angle 900A of compact radar system 100, and the side view 810A in FIG. 9B depicts an example coverage angle 900B of compact radar system 100.

In some cases, a plurality of active devices can be physically distributed across the surface area of PCBs within the compact radar system 100. Distribution of the devices in turn distributes sources of heat generation within the compact radar system 100. Heat can be more efficiently dissipated from multiple smaller, distributed heat sources relative to one larger heat source. The size, weight, power and cost of the heat dissipation mechanism is thereby minimized. The plurality of lower power devices can include, without limitation, gallium nitride (GaN) devices, silicon devices, silicon germanium (SiGe) devices, gallium arsenide (GaAs) devices, or devices of any of a variety of other semiconductor materials. In some examples, the antenna PCBs 514, 516 can utilize a plurality of comparatively low power active devices rather than a single or a few higher power devices, to realize superior heat distribution characteristics and reduced operational temperature requirements of any individual device.

In some cases, lower power components can be used to reduce heat generation and it turn permit more efficient heat dissipation. For example, standard and/or "off the shelf" PCBs and/or application specific, custom, exotic, or mil spec PCBs can be used. In some cases, one or more components can be implemented to simultaneously optimize size, weight, cost, and power consumption while maintaining appropriate isolation between transmit and receive components (e.g., 304 and 306).

In some cases, housings, RF antennas, and/or other components can be constructed from aluminum. For example, housings 322 and 702 can be constructed from aluminum. Internal RF antennas and/or external fins can be milled, stamped, or molded out of aluminum. Aluminum and its alloys are relatively light and have relatively high thermal conductivity.

A compact radar system (100) can include one or more transmit antennas that are electronically steerable in one or more dimensions. Transmit antennas can have variable power control for varying the range of detection and power level. Transmit antennas can be configured in a multi-static or bi-static configuration. Individual active devices can be turned on or off to vary the resultant beam pattern.

A compact radar system (100) can include one or more receive antennas that are electronically steerable in one or more dimensions. Comparing phase and/or amplitude from multiple receive antennas can be used for more acute determination of target azimuth and elevation angles. Receive antennas can be configured in a multi-static or bi-static configuration.

Transmit and receive antennas can operate in Frequency Modulate Continuous Wave mode (FMCW) or in pulsed mode, for example. TX and RX can be steered electronically in a coordinated fashion for maximizing target detection. FMCW allows for detection of objects that are as close as the near field of the antennas. The receiver is coherent with the transmit waveform.

Within a compact radar system (100), different configurations of transmit antennas and receive antennas are possible. For example, compact radar systems (100) can include a transmit antenna and multiple receive antennas, multiple transmit antennas and a receive antenna, or multiple transmit antennas and multiple receive antennas (Multiple Input, Multiple Output). Each transmitter can be coherent with one or more transmit and receive antennas to yield wide coverage areas up to and including 360 degree spherical coverage.

The compact radar system 100 can perform simultaneous coordinated use of beam steering to widen field of view (FOV) and digital beam forming to increase angular resolution, improve range, and suppress noise/clutter/jammers. For example, a compact radar system (100) using a transmit antenna and two receive antennas can more accurately detect an object's angle relative to the compact radar system (e.g., based on the distance between the two receive antennas and received signal phase and amplitude comparisons). Antennas in a compact radar system (100) can be individually powered. Up to N−1 receive antennas can be used for angle detection and nulling rejection of noise/clutter/jammers. In some cases, coordination beam steering and beam forming can be used to detect an object's angle to an accuracy of ½₀th of an antenna's physical beam width.

Multiple compact radar systems (100) can be used simultaneously within overlapping spaces. In one aspect, multiple compact radar systems on the same structure, such as, for example, a vehicle or ground-based installation, are coordinated and/or cooperate to surveil the same space (e.g., air). Data from different compact radar systems observed within the space (e.g., air) can be fused to create an accurate and complete radar view of the volume under surveillance.

In some aspects, different compact radar systems (100) may operate in the same space but without coordination or cooperation. Any of a variety of different mechanisms can be used to minimize or eliminate interference between compact radar systems (100). Mechanisms can include, without limitation, use of Code Division Multiple Access (CDMA) across multiple compact radar systems, use of Time Divisional Multiple Access (TDMA) across multiple compact radar systems, frequency hopping, frequency division, spread spectrum, geographic separation of compact radar systems, aiming of compact radar systems in different directions, intelligent (e.g., machine learning) control of multiple compact radar systems and/or filtering of associated signals, etc.

One or more compact radar systems (100) can be installed or attached on one or more Unmanned Aerial Vehicles (UAVs), a mix of ground vehicles (stationary or in motion), fixed sites such as buildings, various manned or unmanned vehicles (e.g., aircraft), boats, a distributed set of objects on the ground and/or on the air, a geographic area, etc.

Figure 10A:
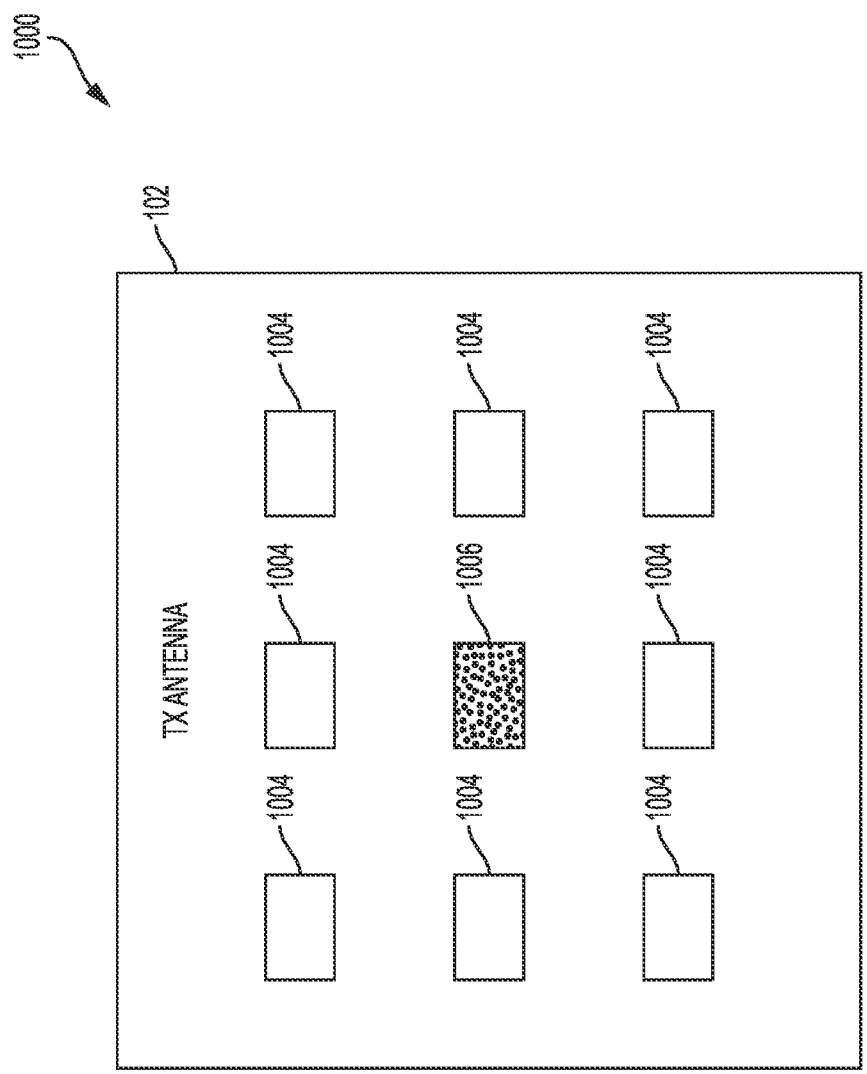
FIG. 10A illustrates an example transmit antenna design for a compact radar system, in accordance with some embodiments.

FIG. 10A illustrates an example transmit antenna design 1000. In this example, antenna 102 is a transmit antenna including antenna patches 1004 and 1006. Patch 1006 is a transmit antenna patch element for transmitting RF signals. Patches 1004 can represent dummy patches surrounding the patch 1006. The patches 1004 can be non-functioning or disabled patches or otherwise patches lacking the configuration or capabilities for transmitting RF signals. Instead of using the patches 1004 to program a receive antenna element, a separate antenna element design can be implemented for receive antennas.

The number and configuration of patches 1004 and 1006 is provided herein for illustration purposes and without limitation. It should be understood that other examples can include a different number or configuration of patches 1004 and 1006. For example, in some cases, the antenna design 1000 can include more or less patches 1004 and/or 1006 than those illustrated in FIG. 10A.

FIG. 10B illustrates an example receive antenna design 1020. In this example, the antenna 102 is a receive antenna including four receive channels 1022. The design 102 can thus provide a single element per channel. The number of channels (1022) and/or elements in the design 1020 can vary in different examples to include more or less than those illustrated in FIG. 10B. The antenna 102 in antenna design 1020 can also be surrounded by one or more dummy patch antennas, as previously explained.

Figure 11:
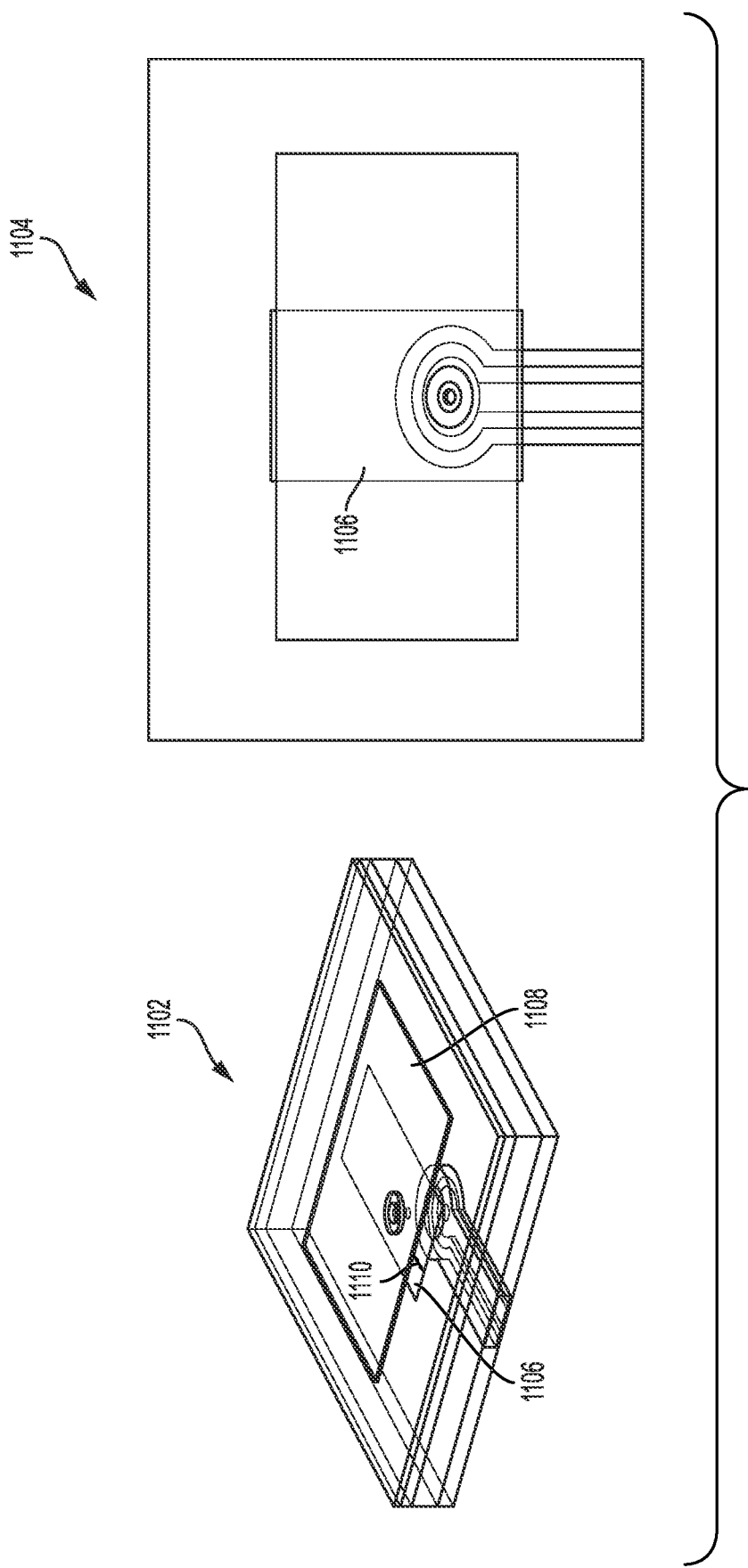
FIG. 11 illustrates an example stacked patch antenna design for a compact radar system, in accordance with some embodiments.

FIG. 11 illustrates different views 1102, 1104 of an example stacked patch antenna design. In view 1102, patches 1106 and 1108 are included in the stacked antenna design. The patches 1106 and 1108 can have different sizes or configurations for widening the bandwidth. The patches 1106 and 1108 can be tuned to have different resonances to increase the bandwidth.

A gap 1110 can separate the patch 1106 and the patch 1108 or otherwise provide spacing between the patches 1106 and 1108. In some cases, a gap can also be provided above the patch 1108 and/or any other location. In some cases, the spacing or gap (e.g., gap 1110) can help reduce or eliminate loss, increase signal penetration, etc.

Having disclosed example system components and concepts, the disclosure now turns to the example method for implementing a compact radar system, as shown in FIG. 12. For the sake of clarity, the method is described with reference to the compact radar system 100, as shown in FIG. 1. The steps outlined herein are examples and can be implemented in any combination thereof, including combinations that exclude, add, or modify certain steps.

At step 1202, the method can involve deploying a radar system (100) configured to detect one or more objects within a distance of the radar system (100), the radar system (100) including one or more processors, a first set of receive antennas (102) and a second set of transmit antennas (102), the one or more processors being configured to coordinate (a) beam steering of the first set of receive antennas (102) and the second set of transmit antennas (102) and (b) digital beam forming at the first set of receive antennas (102) and the second set of transmit antennas (102) to detect the one or more objects. The first set of receive antennas can include one or more receive antennas. Similarly, the second set of transmit antennas can include one or more transmit antennas.

At step 1204, the method involves sending, using at least one of the first set of receive antennas (102) on the radar system (100), one or more electromagnetic signals. At step 1206, the method can involve receiving, using at least one of the second set of transmit antennas (102), one or more returned electromagnetic signals. The one or more returned electromagnetic signals can be one or more signals reflected off an object, from the one or more electromagnetic signals sent at step 1204. The one or more returned electromagnetic signals can be used to identify properties of the object from which such signals were reflected, as described herein.

Based on the one or more returned electromagnetic signals, at step 1208, the method can involve detecting (e.g., via the radar system 100) an object within the distance of the radar system (100). For example, the one or more returned electromagnetic signals can be signals reflected from the object. The radar system (100) can analyze the one or more returned electromagnetic signals and identify an angle, a range, a radar cross section, a velocity, and/or other properties of the object relative to the radar system (100).

The radar system (100) can identify such properties of the object based on, for example, a difference in the time when the one or more electromagnetic signals were sent and the one or more returned electromagnetic signals were received, a direction of the one or more electromagnetic signals and/or the one or more returned electromagnetic signals, a strength or characteristic of the one or more returned electromagnetic signals, an indication of which or how many electromagnetic signals sent within a time period were returned or reflected as well as any characteristics (e.g., time, direction, angle, speed, strength, etc.) of the electromagnetic signals sent and/or received (e.g., reflected or returned) within the time period, etc.

In some examples, the radar system (100) can coordinate beam steering and beam forming and suppress a signal noise, clutter, jamming, etc. at the radar system (100). In some cases, the radar system (100) can perform space time adaptive processing from among the first set of receive antennas.

In some implementations, the radar system (100) can isolate radar transmissions from received signal reflections using one or more fins (e.g., 802) between the first set of receive antennas and the second set of transmit antennas. The received signal reflections can refer to at least a portion of the one or more returned electromagnetic signals, for example.

The radar system (100) can also perform RF channeling or modulation. For example, in some cases, the radar system (100) can use an RF channeling or modulation element (e.g., 500) for heat dissipation, RF channel isolation, mechanical vibration reduction, wave propagation, signal modulation, etc.

In some cases, the radar system (100) through its antennas (102) can provide up to and including 360 degree spherical coverage. Thus, the radar system (100) can have a 360 degree FOV and can detect objects located at any angle (e.g., within the 360 degree FOV of the radar system) relative to the radar system (100).

In some examples, the radar system (100) can include six antennas (102) where each antenna has 120 degrees azimuth and 120 degrees elevation, so that the six antennas with 120 by 120 degree coverage can provide the radar system (100) 360 degree spherical coverage.

Moreover, in some implementations of the example method, the radar system (100) can obtain radar sensor measurements, detect objects based on the radar sensor measurements, make calculations and/or identify properties pertaining to the detected objects, and output information about the detected objects, such as angle, velocity, trajectory, size, shape, altitude, patterns, distance, etc. In some cases, the radar system (100) can send some or all of the collected and/or calculated data to one or more remote devices, such as a vehicle, a vehicle operator's device, a traffic controller, a server, a collection system, etc. For example, the radar system (100) can report detected objects to one or more devices, and provide feedback as well as any other data obtained by the radar system (100).

The disclosure now turns to FIG. 13, which illustrates an example computing system including various hardware components which can be implemented with the radar system 100 and/or a computing device configured to communicate with the radar system 100 and perform various computing operations.

In this example, FIG. 13 illustrates a computing system architecture for an example computing system 1300, including components in electrical communication with each other using a connection 1305, such as a bus. System 1300 includes a processing unit (CPU or processor) 1310 and a system connection 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well.

The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the actual processor design. The processor 1310 may be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include services 1332, 1334, 1336 for controlling the processor 1310. Other hardware or software modules are contemplated. The storage device 1330 can be connected to the system connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
deploying a radar system configured to detect one or more objects within a range of the radar system, the radar system comprising a set of patch antennas having a first set of transmit antennas and a second set of receive antennas, wherein an electromagnetic signal isolation structure configured between the first set of transmit antennas and the second set of receive antennas comprises at least one fin that isolates electromagnetic signals between the first set of transmit antennas and the second set of receive antennas and/or dissipates heat, and wherein the radar system is configured to coordinate (a) digital beam steering of the first set of transmit antennas and the second set of receive antennas and (b) digital beam forming at the first set of transmit antennas and the second set of receive antennas to detect the one or more objects;

transmitting, using the first set of transmit antennas, an electromagnetic signal;
receiving, using the second set of receive antennas, a returned electromagnetic signal; and
detecting, based on the returned electromagnetic signal, an object.

2. The method of claim 1, wherein detecting the object comprises determining at least one of an angle, a range, a radar cross section, and a velocity of the object relative to the radar system.

3. The method of claim 1, wherein coordinating (a) digital beam steering and (b) digital beam forming comprises suppressing at least one of signal noise, clutter, jamming at the radar system, and space time adaptive processing from among the second set of receive antennas.

4. The method of claim 1, wherein received signal reflections comprise at least a portion of the returned electromagnetic signal.

5. The method of claim 1, further comprising performing, using an RF channeling element associated with the radar system, one or more of heat dissipation, RF channel isolation, mechanical vibration reduction and wave propagation.

6. The method of claim 1, wherein the set of patch antennas comprises patches with different resonances to increase bandwidth.

7. The method of claim 1, wherein the set of patch antennas comprises a gap that separates patches of the set of patch antennas to reduce or eliminate loss.

8. The method of claim 1, wherein the set of patch antennas comprises one or more of a stacked patch antenna structure and a use of at least one dummy patch antennas.

9. A radar system comprising:
one or more processors;
a set of patch antennas comprising a first set of transmit antennas and a second set of receive antennas;
one or more electromagnetic signal isolation structure configured between the first set of transmit antennas and the second set of receive antennas that isolate transmission signals from received signals, wherein the one or more electromagnetic signal isolation structure comprises at least one fin that isolates electromagnetic signals between the first set of transmit antennas and the second set of receive antennas and/or dissipates heat; and
a computer-readable storage device storing instructions which, when executed by the one or more processors, cause the one or more processors to perform operations comprising:
coordinating (a) digital beam steering of the first set of transmit antennas and the second set of receive antennas and (b) digital beam forming at the first set of transmit antennas and the second set of receive antennas to detect an object;
transmitting, using the first set of transmit antennas, an electromagnetic signal;
receiving, using the second set of receive antennas, a returned electromagnetic signal; and
detecting, based on the returned electromagnetic signal, an object.

10. The radar system of claim 9, wherein detecting the object comprises determining at least one of an angle, a range, a radar cross section, and a velocity of the object relative to the radar system.

11. The radar system of claim 9, wherein coordinating (a) digital beam steering and (b) digital beam forming comprises suppressing, using the one or more processors, at least one of signal noise, clutter, jamming at the radar system, and space time adaptive processing from among the second set of receive antennas.

12. The radar system of claim 9, wherein a received signal reflections comprise at least a portion of the returned electromagnetic signal.

13. The radar system of claim 9, further comprising performing, using an RF channeling element associated with the radar system, one or more of heat dissipation, RF channel isolation, mechanical vibration reduction and wave propagation.

14. The radar system of claim 9, wherein the set of patch antennas comprises patches with different resonances to increase bandwidth.

15. The radar system of claim 9, wherein the set of patch antennas comprises a gap that separates patches of the set of patch antennas to reduce or eliminate loss.

16. The radar system of claim 9, wherein the set of patch antennas comprises one or more of a stacked patch antenna structure and a use of at least one dummy patch antennas.

17. A computer-readable storage device storing instructions which, when executed by one or more processors in communication with a set of patch antennas comprising a first set of transmit antennas and a second set of receive antennas, cause the one or more processors to be configured to:
coordinate (a) digital beam steering of the first set of transmit antennas and the second set of receive antennas and (b) digital beam forming at the first set of transmit antennas and the second set of receive antennas to detect an object;
transmit, using the first set of transmit antennas, an electromagnetic signal;
receive, using the second set of receive antennas, a returned electromagnetic signal, wherein an electromagnetic signal isolation structure is configured between the first set of transmit antennas and the second set of receive antennas that isolate transmission signals from received signals, wherein the electromagnetic signal isolation structure comprises at least one fin that isolates electromagnetic signals between the first set of transmit antennas and the second set of receive antennas and/or dissipates heat; and
detect, based on the returned electromagnetic signal, the object.

18. The computer-readable storage device of claim 17, wherein the one or more processors are further configured to detect the object by determining at least one of an angle, a range, a radar cross section, and a velocity of the object relative to the computer-readable storage device.

19. The computer-readable storage device of claim 17, wherein the one or more processors are further configured to coordinate (a) digital beam steering and (b) digital beam forming by suppressing at least one of signal noise, clutter, jamming at the computer-readable storage device, and space time adaptive processing from among the second set of receive antennas.

20. The computer-readable storage device of claim 17, wherein the one or more processors are further configured to perform, using an RF channeling element associated with the computer-readable storage device, one or more of heat dissipation, RF channel isolation, mechanical vibration reduction and wave propagation.

* * * * *